(12) United States Patent
Hu et al.

(10) Patent No.: US 11,463,873 B2
(45) Date of Patent: Oct. 4, 2022

(54) COMMUNICATION METHOD AND DEVICE

(71) Applicant: HUAWEI TECHNOLOGIES CO., LTD., Guangdong (CN)

(72) Inventors: Li Hu, Shanghai (CN); Jing Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 51 days.

(21) Appl. No.: 16/749,911

(22) Filed: Jan. 22, 2020

(65) Prior Publication Data

US 2020/0162906 A1 May 21, 2020

Related U.S. Application Data

(63) Continuation of application No. PCT/CN2018/095246, filed on Jul. 11, 2018.

(30) Foreign Application Priority Data

Jul. 27, 2017 (CN) .......................... 201710627211.1

(51) Int. Cl.
*H04W 12/00* (2021.01)
*H04W 12/0431* (2021.01)
(Continued)

(52) U.S. Cl.
CPC ............ *H04W 12/0431* (2021.01); *H04W 12/0433* (2021.01); *H04W 36/0038* (2013.01); *H04W 36/08* (2013.01); *H04W 92/20* (2013.01)

(58) Field of Classification Search
CPC ......... H04W 12/0431; H04W 12/0433; H04W 36/0038; H04W 36/08; H04W 92/20
See application file for complete search history.

(56) References Cited

U.S. PATENT DOCUMENTS

| 2008/0039096 A1 | 2/2008 | Forsberg |
| 2009/0209259 A1 | 8/2009 | Brusilovsky et al. |

(Continued)

FOREIGN PATENT DOCUMENTS

| CN | 101946535 A | 1/2011 |
| CN | 102238541 A | 11/2011 |

(Continued)

OTHER PUBLICATIONS

Ericsson:"Key refresh in NR", 3GPP TSG-RAN WG2 #98, Tdoc R2-1704171, Hangzhou, P.R. of China, May 15-19, 2017, total 3 pages.

(Continued)

*Primary Examiner* — Dai Phuong
(74) *Attorney, Agent, or Firm* — Womble Bond Dickinson (US) LLP

(57) ABSTRACT

The present disclosure discloses a communication method and a device. The method is performed by a target base station and includes: receiving a handover request from a source base station, where the handover request includes a first key and first indication information, and the first indication information is used to indicate whether the first key is an updated key; and sending second indication information to the source base station based on the handover request, where the second indication information is used to indicate whether an access layer key between the target base station and a terminal device is an updated key. Using the embodiments of the present disclosure helps resolve a problem that a potential security risk exists in data transmitted between the terminal device and the target base station, and helps resolve a problem that a key change of the terminal device is not controlled by the base station.

19 Claims, 12 Drawing Sheets

(51) Int. Cl.
*H04W 36/00* (2009.01)
*H04W 36/08* (2009.01)
*H04W 12/0433* (2021.01)
*H04W 92/20* (2009.01)

(56) References Cited

U.S. PATENT DOCUMENTS

| | | | | |
|---|---|---|---|---|
| 2012/0244865 | A1* | 9/2012 | Iwamura | H04W 36/0055 |
| | | | | 455/437 |
| 2012/0308007 | A1* | 12/2012 | Li | H04W 12/106 |
| | | | | 380/270 |
| 2015/0319652 | A1* | 11/2015 | Liu | H04L 9/0869 |
| | | | | 455/410 |
| 2016/0249210 | A1 | 8/2016 | Chang et al. | |
| 2016/0309375 | A1 | 10/2016 | Dai et al. | |
| 2018/0192347 | A1* | 7/2018 | Shaheen | H04W 36/0077 |
| 2018/0302834 | A1* | 10/2018 | Zhang | H04W 36/0027 |
| 2019/0239130 | A1* | 8/2019 | Nakarmi | H04W 12/0431 |
| 2020/0029211 | A1* | 1/2020 | Laselva | H04W 28/0252 |
| 2020/0120499 | A1* | 4/2020 | Norrman | H04L 63/061 |
| 2021/0058426 | A1* | 2/2021 | Basu Mallick | H04L 63/1416 |
| 2021/0084544 | A1* | 3/2021 | Axen | H04W 12/041 |

FOREIGN PATENT DOCUMENTS

| | | |
|---|---|---|
| CN | 103747442 A | 4/2014 |
| CN | 103959829 A | 7/2014 |
| CN | 104125563 A | 10/2014 |
| EP | 2429227 A1 | 3/2012 |
| WO | 2014100929 A1 | 7/2014 |
| WO | 2017061924 A1 | 4/2017 |

OTHER PUBLICATIONS

Ericsson:"New solution—Flexibile mechanism for AS key-change", 3GPP TSG SA WG3 (Security) Meeting #86-Bis S3-170957, Mar. 27-31, 2017, Busan (South Korea), total 3 pages.

RAN3:"LS on Status of Higher-Layer Functional split between Central and Distributed unit", 3GPP TSG RAN WG2#97bis, R2-1703886, Spokane, USA, Apr. 3-7, 2017. 1 page.

Ericsson:"New KI—Flexibility to retain or to change AS security keys", 3GPP TSG-SA WG3 Meeting #86, S3-170447, Sophia Antipolis, France, Feb. 6-10, 2017, total 2 pages.

3GPP TSG-RAN WG2 #98-AH,Tdoc R2-1706328:"Key refresh in NR",Ericsson,Qingdao, P.R. of China, Jun. 27 29, 2017,total 3 pages.

\* cited by examiner

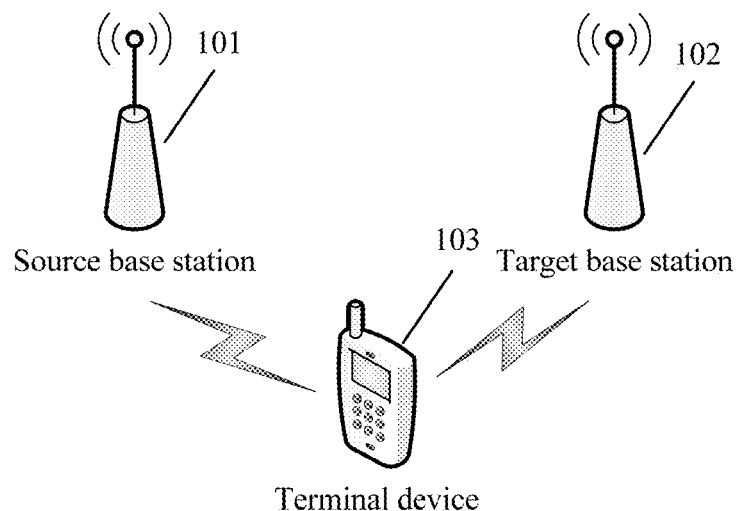

Source base station　　Target base station

Terminal device

A target base station receives a handover request from a source base station, where the handover request includes a first key and first indication information, and the first indication information is used to indicate whether the first key is an updated key

202

The target base station sends second indication information to the source base station based on the handover request, where the second indication information is used to indicate whether an access layer key used between the target base station and a terminal device is an updated key

FIG. 2

COMMUNICATION METHOD AND DEVICE

CROSS-REFERENCE TO RELATED APPLICATIONS

This application is a continuation of International Application No. PCT/CN2018/095246, filed on Jul. 11, 2018, which claims priority to Chinese Patent Application No. 201710627211.1, filed on Jul. 27, 2017. The disclosures of the aforementioned applications are hereby incorporated by reference in their entireties.

TECHNICAL FIELD

This application relates to the communications field, and in particular, to a communication method and a device.

BACKGROUND

In a mobile network, when a terminal device moves from a source base station to a target base station, a handover procedure is performed. In the handover procedure, the source base station may send a key between the source base station and the terminal device to the target base station, and the key continues to be used for a communication between the terminal device and the target base station.

If the source base station is attacked before the handover occurs, after the terminal device is handed over from the source base station to the target base station, a potential security risk exists in data transmitted between the terminal device and the target base station. For example, an attacker may forge a key by using the attacked source base station, and send the forged key to the target base station. The target base station fully trusts the source base station, and transmits data to the terminal device by using the forged key. In this case, the data may still be cracked by the attacker of the source base station.

SUMMARY

Embodiments of the present disclosure provide a communication method and a device, which helps resolve a problem that a potential security risk exists in data transmitted between a terminal device and a target base station.

According to a first aspect, an embodiment of the present disclosure provides a communication method, including:

receiving, by a target base station, a handover request from a source base station, where the handover request includes a first key and first indication information, and the first indication information is used to indicate whether the first key is an updated key; and sending, by the target base station, second indication information to the source base station based on the handover request, where the second indication information is used to indicate whether an access layer key between the target base station and a terminal device is an updated key.

In a feasible embodiment, the sending, by the target base station, second indication information to the source base station based on the handover request includes:

sending, by the target base station, the second indication information to the source base station when the first indication information is used to indicate that the first key is an updated key, where the second indication information is used to indicate that the access layer key between the target base station and the terminal device is an updated key; or sending, by the target base station, the second indication information to the source base station based on reference information when the first indication information is used to indicate that the first key is not an updated key.

In a feasible embodiment, the sending, by the target base station, the second indication information to the source base station based on reference information includes:

sending, by the target base station, the second indication information to the source base station when the reference information includes a trust level of the target base station for the source base station, and the trust level is higher than a trust threshold, where the second indication information is used to indicate that the access layer key between the target base station and the terminal device is not an updated key; or sending, by the target base station, the second indication information to the source base station when the reference information includes policy indication information, and the policy indication information instructs the target base station not to update a key, where the second indication information is used to indicate that the access layer key between the target base station and the terminal device is not an updated key.

In a feasible embodiment, the sending, by the target base station, the second indication information to the source base station based on reference information includes:

sending, by the target base station, the second indication information to the source base station when the reference information includes a trust level of the target base station for the source base station, and the trust level is lower than a trust threshold, where the second indication information is used to indicate that the access layer key between the target base station and the terminal device is an updated key; or sending, by the target base station, the second indication information to the source base station when the reference information includes policy indication information, and the policy indication information instructs the target base station to update a key, where the second indication information is used to indicate that the access layer key between the target base station and the terminal device is an updated key.

In a feasible embodiment, the handover request further includes a next hop chaining counter NCC, and the method further includes:

sending, by the target base station, the NCC to the terminal device by using the source base station.

In a feasible embodiment, when the second indication information is used to indicate that the access layer key between the target base station and the terminal device is an updated key, the method further includes:

generating, by the target base station, a second key based on the NCC.

In a feasible embodiment, the method further includes:

receiving, by the target base station, third indication information from the terminal device; and generating, by the target base station, a second key based on a NCC when the third indication information is used to instruct the terminal device to update a key, and the second indication information is used to indicate that the access layer key between the target base station and the terminal device is not an updated key; and sending the NCC to the terminal device.

In a feasible embodiment, the method further includes:

receiving, by the target base station, third indication information from the terminal device; and sending, by the target base station, the NCC to the terminal device when the third indication information is used to instruct the terminal device not to update a key, and the second indication information is used to indicate that the access layer key between the target base station and the terminal device is an updated key.

According to a second aspect, an embodiment of the present disclosure provides a communication method, including:

sending, by a source base station, a handover request to a target base station, where the handover request carries a first key and first indication information, and the first indication information is used to indicate whether the first key is an updated key;

receiving, by the source base station, second indication information from the target base station, where the second indication information is used to indicate whether an access layer key between the target base station and the terminal device is an updated key; and sending, by the source base station, the second indication information to the terminal device.

In a feasible embodiment, the method further includes:

sending, by the source base station, a first message to the terminal device when the second indication information indicates that the access layer key between the target base station and the terminal device is an updated key, or when the first indication information indicates that the first key is not an updated key and the second indication information indicates that the access layer key between the target base station and the terminal device is an updated key, or when the first indication information indicates that the first key is an updated key and the second indication information indicates that the access layer key between the target base station and the terminal device is an updated key, where the first message is used to request to change a radio resource control RRC connection.

In a feasible embodiment, when the source base station and the target base station belong to a same central unit CU, the first indication information is used to indicate that the first key is not an updated key; or when the source base station and the target base station do not belong to a same CU, the first indication information is used to indicate that the first key is an updated key; or when a trust level of the source base station for the target base station is lower than a trust threshold, the first indication information is used to indicate that the first key is an updated key; or when a trust level of the source base station for the target base station is higher than a trust threshold, the first indication information is used to indicate that the first key is not an updated key.

According to a third aspect, an embodiment of the present disclosure provides a communication method, including:

receiving, by a terminal device, second indication information from a source base station, where the second indication information is used to indicate whether an access layer key between a target base station and the terminal device is an updated key; and updating, by the terminal device, a key of the terminal device based on the second indication information.

In a feasible embodiment, the updating, by the terminal device, a key of the terminal device based on the second indication information includes:

updating, by the terminal device, the key of the terminal device when the second indication information is used to indicate that the access layer key between the target base station and the terminal device is an updated key; or updating, by the terminal device, the key of the terminal device based on reference information when the second indication information is used to indicate that the access layer key between the target base station and the terminal device is not an updated key.

In a feasible embodiment, the updating, by the terminal device, the key of the terminal device based on reference information includes:

updating, by the terminal device, the key of the terminal device when the reference information includes policy indication information, and the policy indication information is used to instruct the terminal device to update a key.

In a feasible embodiment, the updating, by the terminal device, the key of the terminal device includes:

receiving, by the terminal device, a next hop chaining counter NCC; and generating, by the terminal device, a derived key based on the NCC.

In a feasible embodiment, the method further includes:

sending, by the terminal device, third indication information to the target base station, where the third indication information is used to instruct the terminal device to update a key.

According to a fourth aspect, an embodiment of the present disclosure provides a communication method, including:

receiving, by a terminal device, second indication information from a source base station, where the second indication information is used to indicate whether an access layer key between a target base station and the terminal device is an updated key; and sending, by the terminal device, third indication information to the target base station based on the second indication information, where the third indication information is used to instruct the terminal device not to update a key.

In a feasible embodiment, the sending, by the terminal device, third indication information to the target base station based on the second indication information includes:

sending, by the terminal device, the third indication information to the target base station when the second indication information is used to indicate that the access layer key between the target base station and the terminal device is not an updated key; or sending, by the terminal device, the third indication information to the target base station based on reference information when the second indication information is used to indicate that the access layer key between the target base station and the terminal device is not an updated key.

In a feasible embodiment, the sending, by the terminal device, the third indication information to the target base station based on reference information includes:

sending, by the terminal device, the third indication information to the target base station when the reference information includes policy indication information, and the policy indication information is used to instruct the terminal device not to update a key.

According to a fifth aspect, an embodiment of the present disclosure provides a base station, including:

a first receiving unit, configured to receive a handover request from a source base station, where the handover request includes a first key and first indication information, and the first indication information is used to indicate whether the first key is an updated key; and a first sending unit, configured to send second indication information to the source base station based on the handover request, where the second indication information is used to indicate whether an access layer key between the target base station and a terminal device is an updated key.

In a feasible embodiment, the first sending unit further includes:

a first sending subunit, configured to send the second indication information to the source base station when the first indication information is used to indicate that the first key is an updated key, where the second indication information is used to indicate that the access layer key between the target base station and the terminal device is an updated key; or a second sending subunit, configured to send the second indication information to the source base station based on reference information when the first indication information is used to indicate that the first key is not an updated key.

In a feasible embodiment, the second sending subunit includes:

a third sending subunit, configured to send the second indication information to the source base station when the reference information includes a trust level of the target base station for the source base station, and the trust level is higher than a trust threshold, where the second indication information is used to indicate that the access layer key between the target base station and the terminal device is not an updated key; or a fourth sending subunit, configured to send the second indication information to the source base station when the reference information includes policy indication information, and the policy indication information instructs the target base station not to update a key, where the second indication information is used to indicate that the access layer key between the target base station and the terminal device is not an updated key.

In a feasible embodiment, the second sending subunit includes:

a fifth sending subunit, configured to send the second indication information to the source base station when the reference information includes a trust level of the target base station for the source base station, and the trust level is lower than a trust threshold, where the second indication information is used to indicate that the access layer key between the target base station and the terminal device is an updated key; or a sixth sending subunit, configured to send, by the target base station, the second indication information to the source base station when the reference information includes policy indication information, and the policy indication information instructs the target base station to update a key, where the second indication information is used to indicate that the access layer key between the target base station and the terminal device is an updated key.

In a feasible embodiment, the handover request further includes a next hop chaining counter NCC, and the base station further includes:

a second sending unit, configured to send the NCC to the terminal device by using the source base station.

In a feasible embodiment, when the second indication information is used to indicate that the access layer key between the target base station and the terminal device is an updated key, the base station further includes:

a first generation unit, configured to generate a second key based on the NCC.

In a feasible embodiment, the base station further includes:

a second receiving unit, configured to receive third indication information from the terminal device;

a second generation unit, configured to generate a second key based on a NCC when the third indication information is used to instruct the terminal device to update a key, and the second indication information is used to indicate that the access layer key between the target base station and the terminal device is not an updated key; and a third sending unit, configured to send the NCC to the terminal device.

In a feasible embodiment, the base station further includes:

a third receiving unit, configured to receive third indication information from the terminal device; and a fourth sending unit, configured to send the NCC to the terminal device when the third indication information is used to instruct the terminal device not to update a key, and the second indication information is used to indicate that the access layer key between the target base station and the terminal device is an updated key.

According to a sixth aspect, an embodiment of the present disclosure provides a base station, including:

a first sending unit, configured to send a handover request to a target base station, where the handover request carries a first key and first indication information, and the first indication information is used to indicate whether the first key is an updated key;

a receiving unit, configured to receive second indication information from the target base station, where the second indication information is used to indicate whether an access layer key between the target base station and the terminal device is an updated key; and a second sending unit, configured to send the second indication information to the terminal device.

In a feasible embodiment, the base station further includes:

a third sending unit, configured to send a first message to the terminal device when the second indication information indicates that the access layer key between the target base station and the terminal device is an updated key, or when the first indication information indicates that the first key is not an updated key and the second indication information indicates that the access layer key between the target base station and the terminal device is an updated key, or when the first indication information indicates that the first key is an updated key and the second indication information indicates that the access layer key between the target base station and the terminal device is an updated key, where the first message is used to request to change radio resource control RRC connection.

In a feasible embodiment, when the source base station and the target base station belong to a same central unit (CU), the first indication information is used to indicate that the first key is not an updated key; or when the source base station and the target base station do not belong to a same CU, the first indication information is used to indicate that the first key is an updated key; or when a trust level of the source base station for the target base station is lower than a trust threshold, the first indication information is used to indicate that the first key is an updated key; or when a trust level of the source base station for the target base station is higher than a trust threshold, the first indication information is used to indicate that the first key is not an updated key.

According to a seventh aspect, an embodiment of the present disclosure provides a terminal device, including:

a receiving unit, configured to receive second indication information from a source base station, where the second indication information is used to indicate whether an access layer key between a target base station and the terminal device is an updated key; and an update unit, configured to update a key of the terminal device based on the second indication information.

In a feasible embodiment, the update unit is configured to:
update the key of the terminal device when the second indication information is used to indicate that the access layer key between the target base station and the terminal device is an updated key; or
update the key of the terminal device based on reference information when the second indication information is used to indicate that the access layer key between the target base station and the terminal device is not an updated key.

In a feasible embodiment, the update unit is configured to:
update the key of the terminal device when the reference information includes policy indication information, and the policy indication information is used to instruct the terminal device to update a key.

In a feasible embodiment, the update unit includes:
a receiving subunit, configured to receive a next hop chaining counter (NCC); and
a generation subunit, configured to generate a derived key based on the NCC.

In a feasible embodiment, the terminal device further includes:
a sending unit, configured to send third indication information to the target base station, where the third indication information is used to instruct the terminal device to update a key.

According to an eighth aspect, an embodiment of the present disclosure provides a terminal device, including:
a receiving unit, configured to receive second indication information from a source base station, where the second indication information is used to indicate whether an access layer key between a target base station and the terminal device is an updated key; and
a sending unit, configured to send third indication information to the target base station based on the second indication information, where the third indication information is used to instruct the terminal device not to update a key.

In a feasible embodiment, the sending unit includes:
a first sending unit, configured to send the third indication information to the target base station when the second indication information is used to indicate that the access layer key between the target base station and the terminal device is not an updated key; or
a second sending unit, configured to send the third indication information to the target base station based on reference information when the second indication information is used to indicate that the access layer key between the target base station and the terminal device is not an updated key.

In a feasible embodiment, the second sending unit is configured to:
send the third indication information to the target base station when the reference information includes policy indication information, and the policy indication information is used to instruct the terminal device not to update a key.

According to a ninth aspect, an embodiment of the present disclosure provides a base station, including:
a memory storing executable program code; and
a controller coupled to the memory, where
the controller invokes the executable program code stored in the memory, to perform some or all of the operations described in the first aspect of the embodiments of the present disclosure.

According to a tenth aspect, an embodiment of the present disclosure provides another base station, including:
a memory storing executable program code; and
a controller coupled to the memory, where
the controller invokes the executable program code stored in the memory, to perform some or all of the operations described in the second aspect of the embodiments of the present disclosure.

According to an eleventh aspect, an embodiment of the present disclosure provides a terminal device, including:
a memory storing executable program code; and
a controller coupled to the memory, where
the controller invokes the executable program code stored in the memory, to perform some or all of the operations described in the third aspect of the embodiments of the present disclosure.

According to a twelfth aspect, an embodiment of the present disclosure provides a terminal device, including:
a memory storing executable program code; and
a controller coupled to the memory, where
the controller invokes the executable program code stored in the memory, to perform some or all of the operations described in the fourth aspect of the embodiments of the present disclosure.

It may be learned that in the solutions in the embodiments of the present disclosure, the source base station sends the handover request to the target base station, to request the target base station to prepare for a handover. The target base station determines, based on the first indication information carried in the handover request and the reference information, whether to update a key, and sends the second indication information to the terminal device. The terminal device determines, based on the second indication information and/or the reference information, whether to update a key. Compared with the prior art, the target base station determines, based on the first indication information and the reference information, whether to update a key, and the terminal device determines, based on the second indication information and the reference information, whether to update a key. This helps resolve a problem that a potential security risk exists in data transmitted between the terminal device and the target base station, and helps resolve a problem that a key change of the terminal device is not controlled by the base station, thereby ensuring secure data transmission between the base station and the terminal device.

These or other aspects of the present disclosure are clearer and more comprehensible in descriptions of the following embodiments.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

FIG. 1 is a schematic diagram of an application scenario of a communication method according to an embodiment of the present disclosure;

FIG. 2 is a schematic flowchart of a communication method according to an embodiment of the present disclosure;

DESCRIPTION OF EMBODIMENTS

Figure 3:
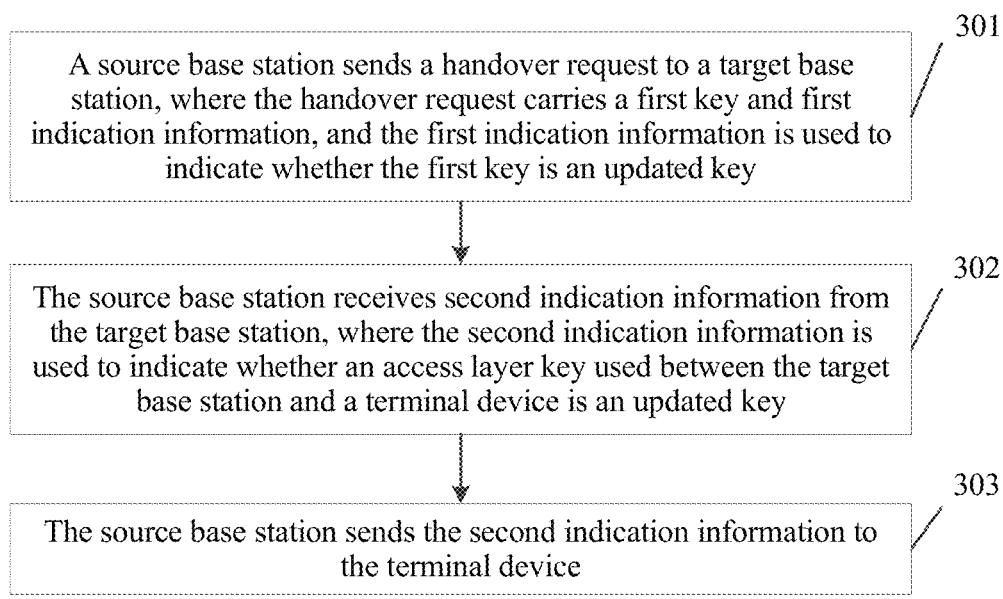
FIG. 3 is a schematic flowchart of another communication method according to an embodiment of the present disclosure.

The following describes the embodiments of this application with reference to accompanying drawings.

FIG. 1 is a schematic diagram of an application scenario of a communication method according to an embodiment of the present disclosure. As shown in FIG. 1, the application scenario includes a source base station 101, a target base station 102, and user equipment 103. The base stations (including the source base station and the target base station) communicate with the user equipment wirelessly. For ease of representation, the communication is represented by using only a lightning type line in FIG. 1. The application scenario shown in FIG. 1 may be specifically applied to a 5G communications system or a subsequent evolved communications system, or may be applied to interaction between the 5G communications system and other communications systems of different standards. For example, the target base station 102 is a gNB in 5G and the source base station 101 is a base transceiver station in a 2G communications system, a NodeB in a 3G communications system, or an eNodeB in a 4G communications system. Apparently, the application scenario may also be applied to a heterogeneous system. For example, the source base station 101 is an access point in a non-3GPP system, and the target base station 102 is the gNB in the 5G communications system. No limitation is imposed.

The source base station 101 and the target base station 102 each may be a macro base station, a micro base station, a picocell base station, a distributed base station, or another type of base station. In the 5G system, a central unit (CU) and a distributed unit (DU) of the source base station 101 may be logically separated from each other, and a CU and a DU of the target base station 102 may be logically separated from each other. The CU is configured to process upper-layer protocol communication between the base station and a terminal device. Specifically, the CU processes an upper-layer protocol stack between the base station and the terminal device, such as a packet data convergence protocol (PDCP) or a radio resource control (RRC) protocol. The DU is configured to process lower-layer protocol communication between the base station and the terminal device. Specifically, the DU processes a lower-layer protocol stack between the base station and the terminal device, such as a radio link control (RLC) protocol or a media access control (MAC) protocol. Optionally, the source base station 101 and the target base station 102 may share a CU.

The terminal device 103 may be user equipment (UE), that is, a device that provides a user with voice and/or data connectivity; or may be a handheld device or an in-vehicle device that has a wireless connection function. Common terminal devices include a mobile phone, a tablet computer, a notebook computer, a palmtop computer, a mobile internet device (MID), and an internet of things device, a wearable device (such as a smartwatch, a smart band, or a pedometer), and the like.

FIG. 2 is a schematic flowchart of a communication method according to an embodiment of the present disclosure. The method includes the following operations.

S201. A target base station receives a handover request from a source base station, where the handover request includes a first key and first indication information, and the first indication information is used to indicate whether the first key is an updated key.

The first key may be a key derived by the source base station, for example, a key generated based on a next hop chaining counter (NCC); or may be an access layer key between the source base station and a terminal device.

The first indication information may be used to indicate that the first key is an updated key, or used to indicate that the first key is a key that is updated. These are only two different description manners, and may be interchangeably used.

The first indication information may be further used to indicate that the first key is a key that is not updated, or used to indicate that the first key is not an updated key. These are only two different description manners, and may be interchangeably used.

For example, when the first key is the key derived by the source base station, the first indication information is used to indicate that the first key is an updated key; or when the first key is the access layer key between the source base station and the terminal device, the first indication information is used to indicate that the first key is a key that is not updated.

The first indication information may be a flag bit in the handover request. That the first indication information is used to indicate whether the first key is an updated key may be specifically as follows: When a value of the flag bit is 0 (0: false), the flag bit indicates that the first key is a key that is not updated, that is, the source base station keeps the access layer key between the source base station and the terminal device unchanged. In other words, the source base station directly transfers the access layer key between the source base station and the terminal device to the target base station. Alternatively, when a value of the flag bit is 1 (1: true), the flag bit indicates that the first key is an updated key, that is, the source base station updates the access layer key between the source base station and the terminal device.

S202. The target base station sends second indication information to the source base station based on the handover request, where the second indication information is used to indicate whether an access layer key between the target base station and the terminal device is an updated key.

The second indication information may be carried in a handover request acknowledgement and sent to the source base station; or may be carried in a first message in the handover request acknowledgement, where the first message is constructed by the target base station; or may be sent to the source base station by newly adding a message. No limitation is imposed.

The first message is used to request to change an RRC connection, for example, establish or change or release a radio bearer. The first message may be an RRC connection reconfiguration message.

The second indication information may be a flag bit in the handover request. That the second indication information is used to indicate whether an access layer key between the target base station and the terminal device is an updated key may be specifically as follows: When a value of the flag bit is 0 (0: false), the flag bit indicates that the access layer key between the target base station and the terminal device is not an updated key, that is, the target base station keeps the access layer key between the target base station and the terminal device unchanged. Alternatively, when a value of the flag bit is 1 (1: true), the flag bit indicates that the access layer key between the target base station and the terminal device is an updated key, that is, the target base station updates the access layer key between the target base station and the terminal device.

The second indication information may be an implicit indication. That the second indication information is used to indicate whether an access layer key between the target base station and the terminal device is an updated key may be specifically as follows: When the first message does not include the second indication information, it indicates that the access layer key between the target base station and the terminal device is not an updated key, that is, the target base station keeps the access layer key between the target base station and the terminal device unchanged. Alternatively, when the first message includes the second indication information, it indicates that the access layer key between the target base station and the terminal device is an updated key, that is, the target base station updates the access layer key between the target base station and the terminal device.

In one embodiment, the second indication information may be an NCC. When the terminal device receives the first message, and the first message does not include the NCC, the terminal device keeps the access layer key between the terminal device and the target base station unchanged. Alternatively, when the terminal device receives the first message, and the first message includes the NCC, the terminal device updates the access layer key between the terminal device and the target base station.

The target base station may send the second indication information to the source base station based on the handover request in the following two implementations:

Manner 1: The target base station sends the second indication information to the source base station when the first indication information is used to indicate that the first key is an updated key. The second indication information is used to indicate that the access layer key between the target base station and the terminal device is an updated key.

In this case, the access layer key between the target base station and the terminal device may be the first key.

Manner 2: When the source base station and the target base station belong to a same central unit (CU), the target base station sends the second indication information to the source base station, where the second indication information and the first indication information have a same function; or the target base station sends the first indication information to the source base station. Alternatively, when the source base station and the target base station do not belong to a same CU, the target base station sends the second indication information to the source base station, and the second indication information is used to indicate that the access layer key between the target base station and the terminal device is an updated key.

The source base station and the target base station may share a CU, or the source base station and the target base station may use different CUs. That the source base station and the target base station may share a CU may be understood as that the source base station and the target base station belong to a same CU. That the source base station and the target base station may use different CUs may be understood as that the source base station and the target base station belong to different CUs.

For example, if the source base station and the target base station belong to a same CU, when the first indication information is used to indicate that the first key is an updated key, the second indication information is used to indicate that the access layer key between the target base station and the terminal device is an updated key; or when the first indication information is used to indicate that the first key is a key that is not updated, the second indication information is used to indicate that the access layer key between the target base station and the terminal device is a key that is not updated.

Manner 3: The target base station sends the second indication information to the source base station based on reference information when the first indication information is used to indicate that the first key is not an updated key.

That the target base station sends the second indication information to the source base station based on reference information may include the following:

the target base station sends the second indication information to the source base station when the reference information includes a trust level of the target base station for the source base station, and the trust level is higher than a trust threshold, where the second indication information is used to indicate that the access layer key between the target base station and the terminal device is not an updated key; or the target base station sends the second indication information to the source base station when the reference information includes policy indication information, and the policy indication information instructs the target base station not to update a key, where the second indication information is used to indicate that the access layer key between the target base station and the terminal device is not an updated key.

The second indication information may be used to indicate that the access layer key between the target base station and the terminal device is a key that is not updated, or used to indicate that the access layer key between the target base station and the terminal device is not an updated key. These are only two different description manners, and may be interchangeably used.

For example, the target base station stores a trust list, and the trust list stores a correspondence between a physical cell identifier (PCI) and a trust level, or a correspondence between an E-UTRAN cell global identifier (ECGI) and a trust level. The correspondence may be determined by locations at which the source base station and the target base station are deployed, or may be determined by a manufacturer of the base stations or the like. When the trust level is higher than the trust threshold, the second indication information is used to indicate that the access layer key between the target base station and the terminal device is not an updated key.

For example, both the trust level of the target base station for the source base station and the trust threshold may be numerical values, and both the trust level and the trust threshold are preconfigured in the target base station.

For example, the policy indication information may include policy indication information of the target base station for the terminal device or for a packet data unit (PDU) session. The policy indication information may be obtained by the target base station from a policy control function (PCF) entity, a unified data management (DM) entity, a structured data storage network function (SDSF) entity, or an unstructured data storage network function (UDSF) entity. The policy indication information is used to indicate whether the access layer key between the target base station and the terminal device is an updated key, or the policy indication information indicates whether a key used for encrypting a PDU session between the target base station and the terminal device is an updated key.

It should be noted that the policy indication information may be understood as a rule obtained by the target base station from a core network, and the rule instructs the target base station to or not to update a key.

When the policy indication information instructs the target base station not to update a key, the second indication information is used to indicate that the access layer key between the target base station and the terminal device is not an updated key.

It should be noted that when the trust level is higher than the trust threshold, or when the policy indication information is used to instruct the target base station not to update a key, the target base station stores the first key, that is, uses the first key as the access layer key between the target base station and the terminal device.

That the target base station sends the second indication information to the source base station based on reference information may include the following:

the target base station sends the second indication information to the source base station when the reference information includes a trust level of the target base station for the source base station, and the trust level is lower than a trust threshold, where the second indication information is used to indicate that the access layer key between the target base station and the terminal device is an updated key; or the target base station sends the second indication information to the source base station when the reference information includes policy indication information, and the policy indication information instructs the target base station to update a key, where the second indication information is used to indicate that the access layer key between the target base station and the terminal device is an updated key.

For the trust level and the policy indication information, refer to the foregoing descriptions. Details are not described again.

In one embodiment, the handover request further includes an NCC, and the method further includes the following:

the target base station sends the NCC to the terminal device by using the source base station.

For example, the target base station may add the NCC to the first message included in the handover request acknowledgement, and send the first message to the source base station. Then the source base station sends the first message to the terminal device.

In one embodiment, with reference to Manner 3, when the second indication information is used to indicate that the access layer key between the target base station and the terminal device is an updated key, the method further includes the following:

the target base station generates a second key based on the NCC.

The second key may be used for access layer communication between the target base station and the terminal device. The target base station may store the second key.

In one embodiment, the target base station may generate the second key based on the NCC and a derivation parameter corresponding to the NCC.

The derivation parameter may include a PCI, an evolved universal terrestrial radio access absolute radio frequency channel number-downlink (EARFCN-DL), and a next hop (NH) that is not used by the source base station or an access layer key currently used between the source base station and the terminal device.

For example, if the NH bound to the NCC is not used, the target base station performs vertical key derivation, and the target base station uses the NH as a derivation parameter. Alternatively, if the NH bound to the NCC is used, the target base station performs horizontal key derivation, and the target base station uses a key currently used by the source base station as a derivation parameter. For the two derivation manners, the derivation parameter may further include the PCI and/or the EARFCN-DL.

In one embodiment, the method further includes the following:

the target base station receives third indication information from the terminal device; and the target base station sends the NCC to the terminal device when the third indication information is used to instruct the terminal device not to update a key, and the second indication information is used to indicate that the access layer key between the target base station and the terminal device is an updated key.

The third indication information may be used to instruct the terminal device not to update a key, or used to indicate that the access layer key between the target base station and the terminal device is a key that is not updated, or used to indicate that the access layer key between the target base station and the terminal device is not an updated key. These are only three different description manners, and may be interchangeably used.

In one embodiment, the method further includes the following:

the target base station receives third indication information from the terminal device; and the target base station generates a second key based on an NCC when the third indication information is used to instruct the terminal device to update a key, and the second indication information is used to indicate that the access layer key between the target base station and the terminal device is not an updated key; and sends the NCC to the terminal device.

The second key may be used for communication between the target base station and the terminal device.

In one embodiment, the method further includes the following:

the target base station receives a new NCC from a mobility management entity (MME) or an access and mobility management function (AMF) entity; and the target base station generates a third key based on the new NCC, and sends the new NCC to the terminal device, so that the terminal device generates a derived key based on the new NCC.

It may be learned that in the solution in this embodiment of the present disclosure, after the target base station receives the handover request of the source base station, the target base station determines, based on the first indication information carried in the handover request and the reference information, whether to update a key, and sets the second indication information. The second indication information is used to indicate whether the access layer key between the target base station and the terminal device is an updated key. The target base station sends the second indication information to the terminal device, so that the terminal device may determine, based on an indication of the second indication information, whether to perform a key update operation. Compared with the prior art, using the solution in this embodiment of the present disclosure helps resolve a problem that a potential security risk exists in data transmitted between the terminal device and the target base station, and helps resolve a problem that a key change of the terminal device is not controlled by the base station.

It should be noted that the nouns, terms, and implementations of operations in the embodiments of this application may be mutually referenced. No limitation is imposed.

FIG. 3 is a schematic flowchart of another communication method according to an embodiment of the present disclosure. The method includes the following operations.

S301. A source base station sends a handover request to a target base station, where the handover request carries a first key and first indication information, and the first indication information is used to indicate whether the first key is an updated key.

The first key may be an access layer key between the source base station and the terminal device, or may be a key derived by the source base station, for example, a key generated by the source base station based on an NCC.

In an example, after the source base station receives a measurement report from the terminal device, and determines, based on the measurement report, that a handover needs to be performed, the source base station sends the handover request to the target base station. The handover request carries the first indication information and the first key.

The first indication information may be used to indicate that the first key is an updated key, or used to indicate that the first key is a key that is updated. These are only two different description manners, and may be interchangeably used.

The first indication information may be further used to indicate that the first key is a key that is not updated, or used to indicate that the first key is not an updated key. These are only two different description manners, and may be interchangeably used.

For example, when the first key is the key derived by the source base station, the first indication information is used to indicate that the first key is an updated key; or when the first key is the access layer key between the source base station and the terminal device, the first indication information is used to indicate that the first key is a key that is not updated.

In one embodiment, the first indication information may be a flag bit in the handover request, and a value of the flag bit may be 1 (1: true) or 0 (0: false). That the first indication information is used to indicate whether the first key is an updated key is specifically as follows: When the value of the flag bit is 0, the flag bit indicates that the first key is not an updated key, that is, the source base station does not update the access layer key between the source base station and the terminal device, and the source base station keeps the access layer key between the source base station and the terminal device unchanged. Alternatively, when the value of the flag bit is 0, the flag bit indicates that the first key is an updated key, for example, the source base station generates the first key based on the NCC.

For example, functions of the first indication information may be different in different cases, and are as follows:

when the source base station and the target base station belong to a same CU, the first indication information is used to indicate that the first key is not an updated key; or when the source base station and the target base station do not belong to a same CU, the first indication information is used to indicate that the first key is an updated key; or when policy indication information instructs the source base station to update a key, the first indication information is used to indicate that the first key is an updated key; or when the policy indication information instructs the source base station not to update a key, the first indication information is used to indicate that the first key is not an updated key; or when a trust level of the source base station for the target base station is lower than a trust threshold, the first indication information is used to indicate that the first key is an updated key; or when a trust level of the source base station for the target base station is higher than a trust threshold, the first indication information is used to indicate that the first key is not an updated key.

For example, the policy indication information may include policy indication information of the source base station for the terminal device or for a PDU session. The policy indication information may be obtained by the source base station from a PCF entity, a UDM entity, an SDSF entity, or a UDSF entity. The policy indication information is used to indicate whether the access layer key between the source base station and the terminal device is an updated key, or the policy indication information indicates whether a key used for encrypting a PDU session between the source base station and the terminal device is an updated key.

It should be noted that the policy indication information may be understood as a rule obtained by the source base station from a core network, and the rule instructs the source base station to or not to update a key.

In one embodiment, when the source base station and the target base station do not belong to a same CU, or when the trust level of the source base station for the target base station is lower than the trust threshold, the source base station generates the first key based on the NCC, and the first indication information is used to indicate that the first key is an updated key.

For a process in which the source base station generates the first key based on the NCC, refer to related content of operation S202. Details are not described herein again.

When the source base station and the target base station belong to a same CU, or when the trust level of the source base station for the target base station is higher than the trust threshold, the source base station keeps the access layer key between the source base station and the terminal device unchanged. To be specific, the first key is not an updated key, and the first indication information is used to indicate that the first key is a key that is not updated.

S302. The source base station receives second indication information from the target base station, where the second indication information is used to indicate whether an access layer key between the target base station and the terminal device is an updated key.

For the second indication information, refer to related descriptions in the embodiment shown in FIG. 2. Details are not described again.

S303. The source base station sends the second indication information to the terminal device.

The source base station may add the second indication information to a first message, and send the first message to the terminal device. The first message may be constructed by the target base station.

It should be noted that the second indication information may use an explicit or implicit manner. For specific content, refer to related descriptions of operation S202. Details are not described herein again.

It may be learned that in the solution in this embodiment of the present disclosure, the source base station determines, based on the measurement report sent by the terminal device, whether to determine to update a key based on a decision, and sets the first indication information. The source base station sends the handover request to the target base station, and the handover request includes the first indication information, so that the target base station determines, based on the first indication information and reference information, whether to update a key. The source base station receives the second indication information sent by the target base station, and sends the second indication information to the terminal device, so that the source base station determines, based on an indication of the second indication information, whether to perform a key update operation. Compared with the prior art (a key needs to be changed during each handover), in the solution in this embodiment of the present disclosure, a base station can be prevented from frequently changing a key, thereby reducing performance overheads.

In one embodiment, in an implementation scenario of the foregoing embodiment, after operation S301, the method further includes the following:

when the source base station and the target base station belong to a same CU, the source base station sends the second indication information to the terminal device, where the second indication information indicates that the access layer key between the target base station and the terminal device is not an updated key; or when the source base station and the target base station belong to a same CU, the source base station sends the second indication information to the terminal device based on a quantity of times that the terminal device does not update a key of the terminal device.

That the source base station sends the second indication information to the terminal based on a quantity of times that the terminal device does not update a key of the terminal device may include the following:

when the quantity of times that the terminal device does not update the key of the terminal device is greater than or equal to a count threshold, the source base station sends the second indication information to the terminal device, where the second indication information is used to indicate that the access layer key between the target base station and the terminal device is an updated key; or when the quantity of times that the terminal device does not update the key of the terminal device is less than a count threshold, the source base station sends the second indication information to the terminal device, where the second indication information is used to indicate that the access layer key between the target base station and the terminal device is not an updated key.

For example, each time the source base station performs a handover for the terminal device, and the access layer key between the terminal device and the target base station is not an updated key after the handover, a counter of the source base station for the quantity of times that the terminal device does not update the key of the terminal device performs a counting operation (the source base station increases a count value of the counter by 1). Each time the source base station performs a handover for the terminal device, and the access layer key between the terminal device and the target base station is an updated key after the handover, the terminal device sets the count value of the counter to 0. When the count value of the counter exceeds the count threshold, the source base station updates the access layer key between the source base station and the terminal device.

It should be noted that if the source base station and the target base station belong to a same CU, operations S302 and S303 are not performed.

In one embodiment, in an implementation scenario of the foregoing embodiment, after operation S302, the method further includes the following:

the source base station reselects a target base station for the terminal device when the first indication information indicates that the first key is an updated key, and the second indication information indicates that the access layer key between the target base station and the terminal device is not an updated key.

It should be noted that if the source base station reselects a target base station for the terminal device, operation S303 is not performed.

In one embodiment, in another implementation scenario of the foregoing embodiment, after operation S302, the method further includes the following:

the source base station sends the first message to the terminal device when the second indication information indicates that the access layer key between the target base station and the terminal device is an updated key; or the source base station sends the first message to the terminal device when the first indication information indicates that the first key is not an updated key, and the second indication information indicates that the access layer key between the target base station and the terminal device is an updated key; or the source base station sends the first message to the terminal device when the first indication information indicates that the first key is an updated key, and the second indication information indicates that the access layer key between the target base station and the terminal device is an updated key.

The first message is used to request to change an RRC connection, for example, establish or change or release a radio bearer. The first message may be an RRC connection reconfiguration message.

In one embodiment, the first message may carry the NCC, or the first message may carry the second indication information.

Figure 4:
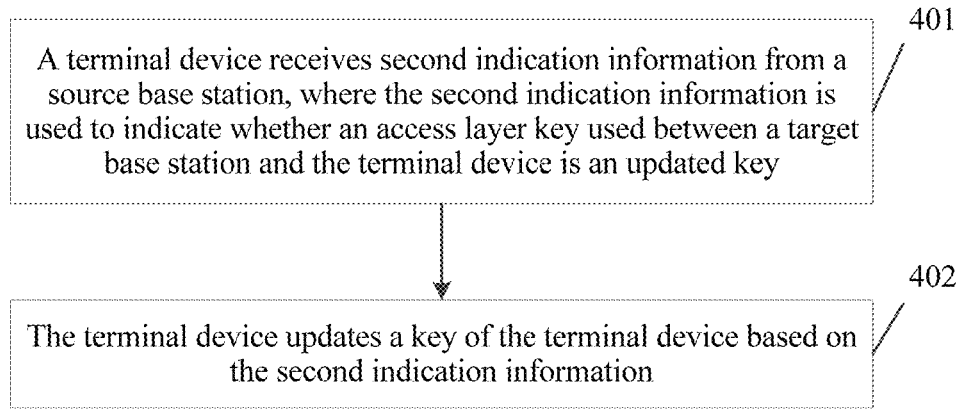
FIG. 4 is a schematic flowchart of another communication method according to an embodiment of the present disclosure.

FIG. 4 is a schematic flowchart of another communication method according to an embodiment of the present disclosure. The method includes the following operations.

S401. A terminal device receives second indication information from a source base station, where the second indication information is used to indicate whether an access layer key between a target base station and the terminal device is an updated key.

The second indication information may be carried in a first message, and the first message is used to request to change an RRC connection, for example, establish or change or release a radio bearer. The first message may be an RRC connection reconfiguration message.

For the second indication information, refer to related descriptions in the embodiment shown in FIG. 2. Details are not described again.

S402. The terminal device updates a key of the terminal device based on the second indication information.

Operation S402 may include the following:

the terminal device updates the key of the terminal device when the second indication information is used to indicate that the access layer key between the target base station and the terminal device is an updated key; or the terminal device updates the key of the terminal device based on reference information when the second indication information is used to indicate that the access layer key between the target base station and the terminal device is not an updated key.

Further, the terminal device may update the key of the terminal device based on the reference information in the following manners.

Manner 1: The terminal device updates the key of the terminal device when the reference information includes policy indication information, and the policy indication information is used to instruct the terminal device to update a key.

For example, the policy indication information may include policy indication information of the target base station for the terminal device or for a PDU session. The policy indication information may be obtained by the terminal device from a PCF entity, a UDM entity, an SDSF entity, or a UDSF entity. The policy indication information is used to indicate whether the access layer key between the target base station and the terminal device is an updated key, or the policy indication information indicates whether a key used for encrypting a PDU session between the target base station and the terminal device is an updated key.

It should be noted that the policy indication information may be understood as a rule obtained by the terminal device from a core network, and the rule instructs the terminal device to or not to update a key.

Manner 2: The terminal device updates the key of the terminal device when the reference information includes a quantity of times that the terminal device does not update the key, and the quantity of times that the terminal device does not update the key exceeds a preset threshold.

For example, each time a handover is performed for the terminal device, and the access layer key between the terminal device and the target base station is not an updated key after the handover, a counter of the terminal device performs a counting operation (the terminal device increases a count value of the counter by 1). Each time a handover is performed for the terminal device, and the access layer key between the terminal device and the target base station is an updated key after the handover, the terminal device sets the count value of the counter to 0. When the count value of the counter exceeds the counter threshold, the terminal device updates the key.

Manner 3: The terminal device updates the key of the terminal device when the reference information includes status information indicating whether a tracking area identity (TAI), a radio access network (RAN) group, or a radio access technology (RAT) that is perceived by the terminal device is changed, and the status information indicates that any one of the TAI, the RAN group, and the RAT that are perceived by the terminal device is changed.

Operation S402 in which the terminal device updates the key of the terminal device may include the following:

the terminal device receives an NCC from the source base station, and generates a derived key based on the NCC.

In one embodiment, for a process of generating the derived key based on the NCC, refer to related content of operation S202. Details are not described herein again.

In one embodiment, the method further includes the following operation:

S403. The terminal device sends third indication information to the target base station, where the third indication information is used to instruct the terminal device to update a key.

The third indication information may be transmitted explicitly or implicitly. For specific content, refer to related descriptions of the second indication information in the embodiment shown in FIG. 2.

In one embodiment, the third indication information may be explicitly carried in a second message, and the second message is used to respond to the first message.

For example, when the first message is an RRC connection reconfiguration message, the second message is an RRC connection reconfiguration complete message.

In one embodiment, the third indication information may be a flag bit in the second message, and a value of the flag bit may be 1: true (1: true) or 0: false (0: false). That the third indication information is used to instruct the terminal device to update the key of the terminal device is specifically as follows: When the value of the flag bit is 0, the flag bit instructs the terminal device not to update the key of the terminal device, that is, the terminal device keeps the access layer key between the terminal device and the target base station unchanged. Alternatively, when the value of the flag bit is 1, the flag bit instructs the terminal device to update the key of the terminal device, for example, the terminal device generates the derived key based on the NCC.

In one embodiment, the third indication information may be an implicit indication, that is, the terminal device notifies the target base station by using different messages. For example, when the second message is an RRC connection reconfiguration complete message, it indicates that the terminal device does not update the key of the terminal device, that is, the terminal device keeps the access layer key between the terminal device and the target base station unchanged. Alternatively, when the second message is an RRC connection re-establishment request message, it indicates that the terminal device updates the key of the terminal device, for example, the terminal device generates the derived key based on the NCC.

In one embodiment, the method further includes a key update process triggered by NCC update, and the key update process is as follows:

the terminal device receives a new NCC sent by the target base station, and the terminal device generates a derived key based on the new NCC and a derivation parameter corresponding to the new NCC.

It may be learned that in the solution in this embodiment of the present disclosure, the terminal device receives the second indication information and the NCC that are sent by the source base station. When the second indication information is used to indicate that the access layer key between the target base station and the terminal device is an updated key, the terminal device generates the derived key based on the NCC and the corresponding derivation parameter. This solves a prior-art problem that update of the key of the terminal device is not controlled by the base station.

Figure 5:
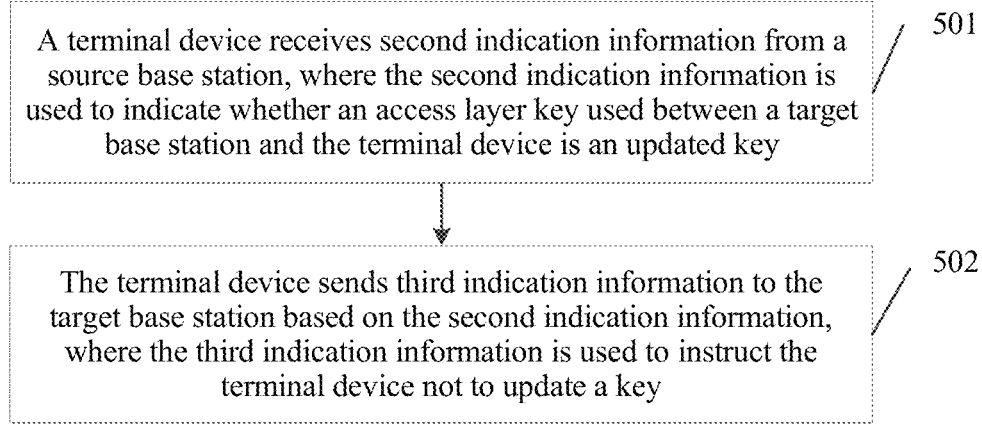
FIG. 5 is a schematic flowchart of another communication method according to an embodiment of the present disclosure.

FIG. 5 is a schematic flowchart of another communication method according to an embodiment of the present disclosure. The method includes the following operations.

S501. A terminal device receives second indication information from a source base station, where the second indication information is used to indicate whether an access layer key between a target base station and the terminal device is an updated key.

The second indication information may be carried in a first message, and the first message is used to request to change an RRC connection, for example, establish or change or release a radio bearer. The first message may be an RRC connection reconfiguration message.

For the second indication information, refer to related descriptions in the embodiment shown in FIG. 2. Details are not described again.

S502. The terminal device sends third indication information to the target base station based on the second indication information, where the third indication information is used to instruct the terminal device not to update a key.

The third indication information may be further used to instruct the terminal device not to update a key, or used to indicate that the access layer key between the terminal device and the target base station is a key that is not updated, or used to indicate that the access layer key between the terminal device and the target base station is not an updated key. These are only three different description manners, and may be interchangeably used.

The third indication information may be carried in a second message, and the second message is used to respond to the first message.

Operation S502 may include the following:

the terminal device sends the third indication information to the target base station when the second indication information is used to indicate that the access layer key between the target base station and the terminal device is not an updated key; or the terminal device sends the third indication information to the target base station based on reference information when the second indication information is used to indicate that the access layer key between the target base station and the terminal device is not an updated key.

The terminal device may send the third indication information to the target base station based on the reference information in the following manners.

Manner 1: The terminal device sends the third indication information to the target base station when the reference information includes policy indication information, and the policy indication information is used to instruct the terminal device not to update a key.

For the policy indication information, refer to related descriptions in the foregoing embodiment. Details are not described again.

Manner 2: The terminal device sends the third indication information to the target base station when the reference information includes a quantity of times that the terminal device does not update a key, and the quantity of times that the terminal device does not update the key exceeds a preset threshold.

Manner 3: The terminal device sends the third indication information to the target base station when the reference information includes status information indicating whether a TAI, a RAN group, or a RAT that is perceived by the terminal device is changed, and the status information indicates that none of the TAI, the RAN group, and the RAT that are perceived by the terminal device is changed.

For example, after the terminal device determines, based on the second indication information and the reference information, not to update the key of the terminal device, the terminal device does not update the key of the terminal device, that is, the terminal device keeps the key of the terminal device unchanged.

In one embodiment, the third indication information may be a flag bit in the second message, and a value of the flag bit may be 1: true (1: true) or 0: false (0: false). That the third indication information is used to instruct the terminal device to update the key of the terminal device is specifically as follows: When the value of the flag bit is 0, the flag bit instructs the terminal device not to update the key of the terminal device, that is, the terminal device keeps the access layer key between the terminal device and the target base station unchanged. Alternatively, when the value of the flag bit is 1, the flag bit instructs the terminal device to update the key of the terminal device, for example, the terminal device generates a derived key based on an NCC.

In one embodiment, the third indication information may be an implicit indication, that is, the terminal device notifies the target base station by using different messages. When the second message is an RRC connection reconfiguration complete message, it indicates that the terminal device does not update the key of the terminal device, that is, the terminal device keeps the access layer key between the terminal device and the target base station unchanged. Alternatively, when the second message is an RRC connection re-establishment request message, it indicates that the terminal device updates the key of the terminal device, for example, the terminal device generates a derived key based on an NCC.

It may be learned that in the solution in this embodiment of the present disclosure, the terminal device receives the second indication information and the NCC that are sent by the source base station. The terminal device keeps the key of the terminal device unchanged when the second indication information is used to indicate that the access layer key between the target base station and the terminal device is not an updated key, or when the second indication information is used to indicate that the access layer key between the target base station and the terminal device is not an updated key and the terminal device determines, based on the reference information, not to update the key. Compared with the prior art, the terminal device determines, based on the indication information sent by the base station side, not to update the key. This resolves a problem that whether to update the key of the terminal device is not controlled by the base station.

In a specific application scenario, the terminal device specifically determines, based on only the reference information in the following manners, whether to update the key.

Manner 1: The terminal device updates the key of the terminal device when the reference information includes policy indication information, and the policy indication information is used to instruct the terminal device to update a key; or the terminal device does not update the key of the terminal device when the reference information includes policy indication information, and the policy indication information is used to instruct the terminal device not to update a key.

For the policy indication information, refer to related descriptions in the embodiment shown in FIG. 4. Details are not described again.

Manner 2: The terminal device updates the key of the terminal device when the reference information includes a quantity of times that the terminal device does not update the key, and the quantity of times that the terminal device does not update the key exceeds a preset threshold; or the terminal device does not update the key of the terminal device when the reference information includes a quantity of times that the terminal device does not update the key, and the quantity of times that the terminal device does not update the key does not exceed a preset threshold.

Manner 3: The terminal device updates the key of the terminal device when the reference information includes status information indicating whether a TAI, a RAN group, or a RAT that is perceived by the terminal device is changed, and the status information indicates that any one of the TAI, the RAN group, and the RAT that are perceived by the terminal device is changed; or the terminal device does not update the key of the terminal device when the reference information includes status information indicating whether a TAI, a RAN group, or a RAT that is perceived by the terminal device is changed, and the status information indicates that none of the TAI, the RAN group, and the RAT that are perceived by the terminal device is changed.

In a specific application scenario, after the terminal device actively determines, based on the reference information, that the terminal device updates the key, the terminal device sends an RRC connection re-establishment request message to the source base station. The message is used to re-establish an RRC connection. After the terminal device receives an RRC connection re-establishment complete message sent by the source base station, the terminal device updates the key of the terminal device.

It should be noted that, that the terminal device updates the key of the terminal device is specifically updating the access layer key between the terminal device and the target base station.

Figure 6A:
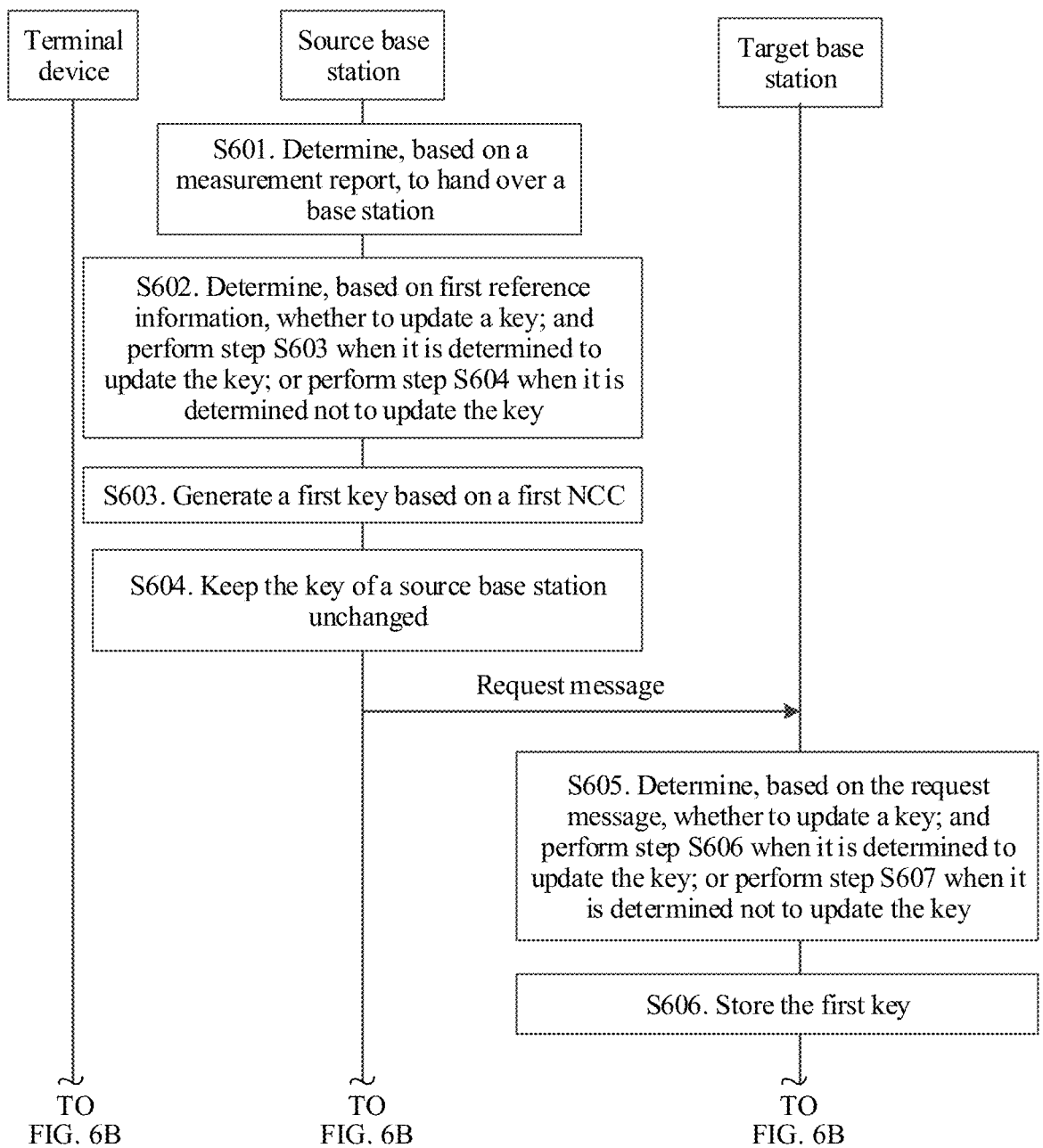
FIG. 6A and FIG. 6B are a schematic diagram of an interactive procedure of a communication method according to an embodiment of the present disclosure.
Figure 6B:
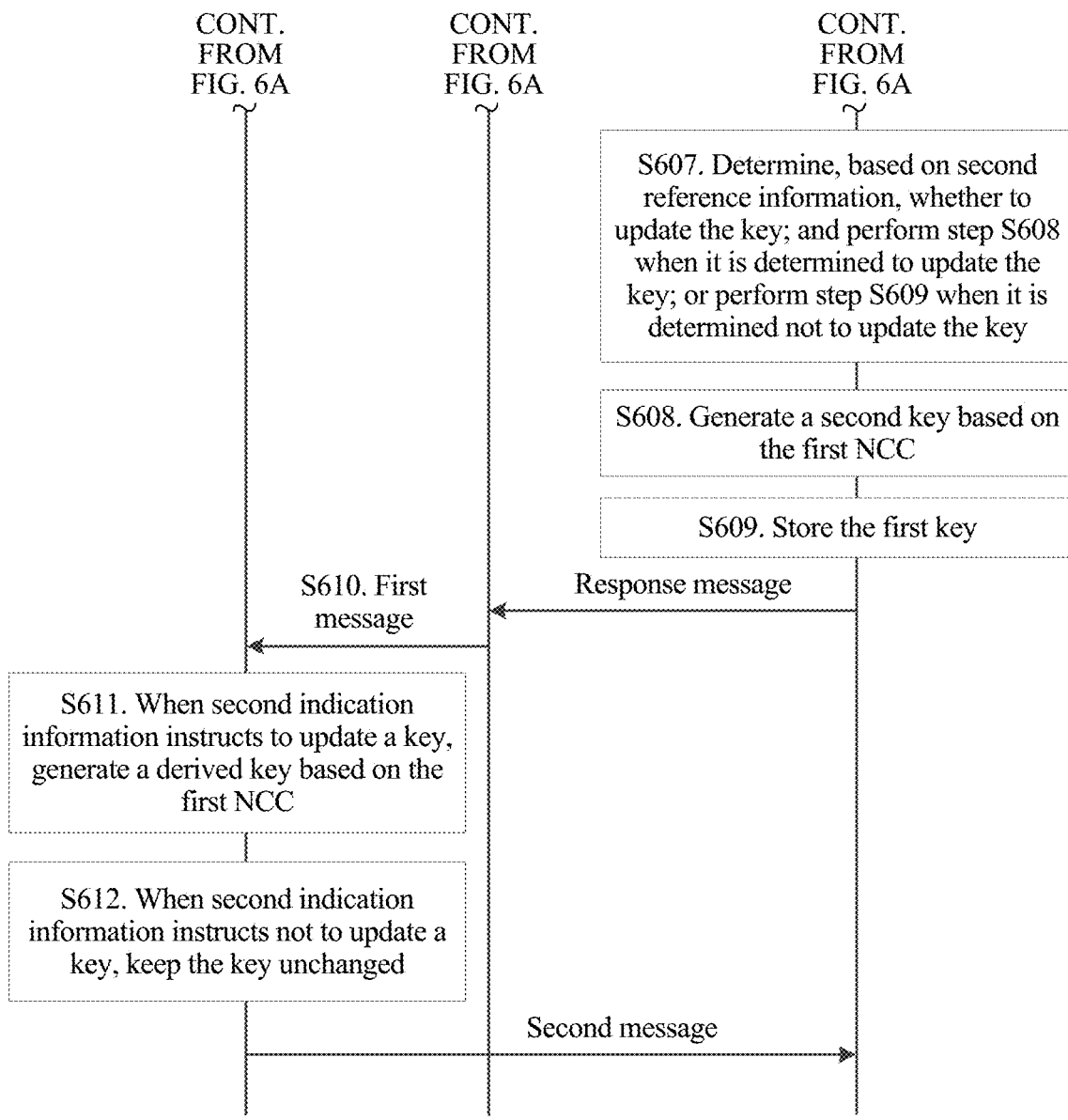

FIG. 6A and FIG. 6B are a schematic diagram of an interactive procedure of a key update method according to an embodiment of the present disclosure. The method includes the following operations.

S601. A source base station determines, based on a measurement report, to hand over a base station.

For example, the source base station receives the measurement report reported by a terminal device, and determines, based on a level or quality information in the measurement report, whether to hand over a base station. This belongs to the prior art and is not described in detail.

S602. The source base station updates an access layer key between the source base station and the terminal device based on first reference information.

The source base station performs operation S603 when the source base station determines, based on the first reference information, to update the access layer key between the source base station and the terminal device; or the source base station performs operation S604 when the source base station determines, based on the first reference information, not to update the access layer key.

The first reference information may include whether the source base station and a target base station belong to a same CU, a trust level of the source base station for the target base station, or first policy indication information.

For example, the source base station performs operation S603 when the first reference information includes whether the source base station and the target base station belong to a same CU, and the source base station and the target base station do not belong to a same CU.

Alternatively, the source base station performs operation S604 when the first reference information includes whether the source base station and the target base station belong to a same CU, and the source base station and the target base station belong to a same CU.

Alternatively, the source base station performs operation S603 when the first reference information includes the first policy indication information, and the first policy indication information instructs the source base station to update a key.

Alternatively, the source base station performs operation S604 when the first reference information includes the first policy indication information, and the first policy indication information instructs the source base station not to update a key.

Alternatively, the source base station performs operation S603 when the first reference information includes the trust level of the source base station for the target base station, and the trust level is higher than a first trust threshold.

Alternatively, the source base station performs operation S604 when the first reference information includes the trust level of the source base station for the target base station, and the trust level is lower than a first trust threshold.

The trust level of the source base station for the target base station is specifically described. The source base station stores a trust list, and the trust list stores a correspondence between a PCI and a trust level or a correspondence between an ECGI and a trust level. The correspondence may be determined by locations at which the source base station and the target base station are deployed, or may be determined by a device manufacturer of the base stations or the like.

For the first policy indication information, refer to related descriptions in the embodiment shown in FIG. 3. Details are not described again.

S603. The source base station generates a first key based on a first NCC, and sends a request message to the target base station.

The request message may include first indication information and the first key, and the first indication information is used to indicate that the first key is an updated key. The first key is the access layer key between the source base station and the terminal device.

For a process in which the source base station generates the first key based on the first NCC, refer to related descriptions of operation S202. Details are not described again.

The request message may be a handover request, and the handover request is used to request the target base station to prepare for a handover. The request message may alternatively be a role change request. The role change request may be used to request the target base station to change from a second base station (Second gNB) to a master base station (Master gNB), and the role change request may be used in a 0-millisecond handover process.

The master base station may be understood as a base station that has an s1/n2 connection to an MME or an AMF entity in a dual connection, and the second base station may be understood as a base station that provides an additional radio resource to the terminal device in the dual connection.

S604. The source base station keeps the key of the source base station unchanged, and sends a request message to the target base station.

The request message may include first indication information, and the first indication information is used to indicate that the first key is a key that is not updated. The first key is the access layer key between the source base station and the terminal device.

S605. The target base station determines, based on the request message, whether to update an access layer key between the target base station and the terminal device.

The target base station performs operation S606 when the target base station determines, based on the request message, to update the access layer key between the target base station and the terminal device; or the target base station performs operation S607 when the target base station determines, based on the request message, not to update the access layer key between the target base station and the terminal device.

For example, when the first indication information is used to indicate that the first key is an updated key, the target base station performs operation S606; or when the first indication information is used to indicate that the first key is not an updated key, the target base station performs operation S607. The first key is the access layer key between the target base station and the terminal device.

S606. The target base station stores the first key, and sends a response message to the source base station.

The response message carries second indication information, and the second indication information is used to indicate that the access layer key between the target base station and the terminal device is an updated key.

S607. The target base station determines, based on second reference information, whether to update the access layer key between the target base station and the terminal device.

The target base station performs operation S608 when the target base station determines, based on the second reference information, to update the access layer key between the target base station and the terminal device; or the target base station performs operation S609 when the target base station determines, based on the second reference information, not to update the access layer key between the target base station and the terminal device.

The second reference information may include a trust level of the target base station for the source base station or second policy indication information.

For example, the target base station performs operation S608 when the trust level is lower than a second trust threshold, or when the second policy indication information is used to instruct the target base station to update a key.

For another example, the target base station performs operation S609 when the trust level is higher than a second trust threshold, or when the second policy indication information is used to instruct the target base station not to update a key.

For the second policy indication information, refer to related descriptions in the embodiment shown in FIG. 2. Details are not described again.

S608. The target base station generates a second key based on the first NCC, and sends a response message to the source base station.

The request message further carries the first NCC. The response message carries second indication information, and the second indication information is used to indicate that the access layer key between the target base station and the terminal device is an updated key.

It should be noted that for a process in which the target base station generates the second key based on the first NCC, refer to related content of operation S202. Details are not described herein again. The second key is the access layer key between the target base station and the terminal device.

S609. The target base station stores the first key, and sends a response message to the source base station.

The response message carries second indication information, and the second indication information is used to indicate that the access layer key between the target base station and the terminal device is not an updated key.

The response messages in operations S606, S608, and S609 are used to respond to the request message in operation S605.

The response message may carry a first message. The first message is used to request to change an RRC connection, for example, establish or change or release a radio bearer. The first message may be an RRC connection reconfiguration message or another newly added message.

In one embodiment, that the response message may carry the second indication information includes the following:

the response message carries the first message, and the first message carries the second indication information; or the response message carries the first message and the second indication information, and there is no mutual inclusion relationship between the first message and the second indication information.

S610. The source base station sends the first message to the terminal device based on the response message.

The response message carries the first message, and the first message may include the first NCC and the second indication information.

In one embodiment, that the source base station sends the second indication information to the terminal device includes the following:

when the source base station and the target base station belong to a same CU, the source base station sends the second indication information to the terminal device, where the second indication information indicates that the access layer key between the target base station and the terminal device is not an updated key; or when the source base station and the target base station belong to a same CU, the source base station sends the second indication information to the terminal device based on a quantity of times that the terminal device does not update a key of the terminal device.

That the source base station sends the second indication information to the terminal based on a quantity of times that the terminal device does not update a key of the terminal device may include the following:

when the quantity of times that the terminal device does not update the key of the terminal device is greater than or equal to a count threshold, the source base station sends the second indication information to the terminal device, where the second indication information is used to indicate that the access layer key between the target base station and the terminal device is an updated key; or when the quantity of times that the terminal device does not update the key of the terminal device is less than a count threshold, the source base station sends the second indication information to the terminal device, where the second indication information is used to indicate that the access layer key between the target base station and the terminal device is not an updated key.

In one embodiment, after the source base station receives the first message from the target base station, the source base station obtains the second indication information from the first message through parsing. The source base station may reselect a target base station for the terminal device when the first indication information indicates that the first key is an updated key, and the second indication information indicates that the access layer key between the target base station and the terminal device is not an updated key. In this case, operation S611 and operations after operation S611 are no longer performed.

In one embodiment, the source base station sends the first message to the terminal device when the second indication information indicates that the access layer key between the target base station and the terminal device is an updated key, or when the first indication information indicates that the first key is not an updated key and the second indication information indicates that the access layer key between the target base station and the terminal device is an updated key, or when the first indication information indicates that the first key is an updated key and the second indication information indicates that the access layer key between the target base station and the terminal device is an updated key. The first message is used to request to change an RRC connection, and the first message includes the second indication information.

It should be noted that for the second indication information, refer to related descriptions in the embodiment shown in FIG. 2. Details are not described herein again.

When the second indication information instructs to update a key, the terminal device performs operation S611; or when the second indication information instructs not to update a key, the terminal device performs operation S612.

For example, when the second indication information is used to indicate that the access layer key between the target base station and the terminal device is an updated key, the terminal device determines to update the key, and the terminal device performs operation S611. Alternatively, when the second indication information is used to indicate that the access layer key between the target base station and the terminal device is not an updated key, the terminal device determines not to update the key, and the terminal device performs operation S612.

In one embodiment, when the first message includes only the first NCC, the terminal device performs operation S611.

S611. The terminal device generates a derived key based on the first NCC, and sends a second message to the target base station.

The second message may be an RRC connection reconfiguration complete message.

In one embodiment, the second message may include third indication information, and the third indication information is used to instruct the terminal device to update a key.

S612. The terminal device keeps the key unchanged, and sends a second message to the target base station.

The second message may be an RRC connection reconfiguration complete message.

In one embodiment, the second message may include third indication information, and the third indication information is used to instruct the terminal device not to update a key.

It should be noted that for the third indication information, refer to related descriptions in the embodiments shown in FIG. 4 and FIG. 5. For the second message, refer to related descriptions of operation S403 and operation S502. Details are not described herein again.

In the solution in this embodiment of the present disclosure, the source base station determines, based on the first reference information, whether to update a key, and generates the first key and sets the first indication information. The source base station sends the handover request to the target base station, and the handover request includes the first key and the NCC. The target base station determines, based on the first indication information and the second reference information, whether to update a key, and generates the second key and sets the second indication information. The target base station sends the second indication information to the terminal device. The terminal device determines, based on an indication of the second indication information, whether to perform a key update operation, and generates the derived key and the third indication information. Compared with the prior art, using the solution in this embodiment of the present disclosure helps resolve a problem that a potential security risk exists in data transmitted between the terminal device and the target base station, and helps resolve a problem that a key change of the terminal device is not controlled by the base station.

In one embodiment, in an implementation scenario of the foregoing embodiment, when the second indication information is used to indicate that the access layer key between the target base station and the terminal device is not an updated key, and the third indication information is used to instruct the terminal device to update a key, the method further includes the following operations:

S613. The target base station generates a second key based on the first NCC, and sends the first NCC to the terminal device, so that the terminal device generates a derived key based on the first NCC.

S614. The terminal device generates the derived key based on the first NCC.

In one embodiment, in another implementation scenario of the foregoing embodiment, when the second indication information is used to indicate that the access layer key between the target base station and the terminal device is an updated key, and the third indication information is used to instruct the terminal device not to update a key, the method further includes the following operations:

S613a. The target base station sends the first NCC to the terminal device, so that the terminal device generates a derived key based on the first NCC.

S614a. The terminal device generates the derived key based on the first NCC.

In one embodiment, in still another implementation scenario of the foregoing embodiment, the method further includes the following operations:

S613b. After the target base station receives a new NCC from an AMF entity or an MME, the target base station generates a second key based on the new NCC, and sends the new NCC to the terminal device, so that the terminal device generates a derived key based on the new NCC.

S614b. The terminal device generates the derived key based on the new NCC.

It should be noted that for operations S601 to S616b, refer to related descriptions in FIG. 2, FIG. 3, FIG. 4, and FIG. 5. Details are not described herein again.

In a specific application scenario of the foregoing embodiment, the terminal device sends an RRC connection reconfiguration complete message to the target base station. When the terminal device determines that the message is unsuccessfully sent, the terminal device constructs an RRC connection re-establishment request message, and sends the RRC connection re-establishment request message to the target base station. The message is used to re-establish an RRC connection. After receiving the message, the target base station can determine that the terminal device updates the key, and send an RRC connection re-establishment complete message to the terminal device, to respond to the RRC connection re-establishment request message.

Figure 7A:
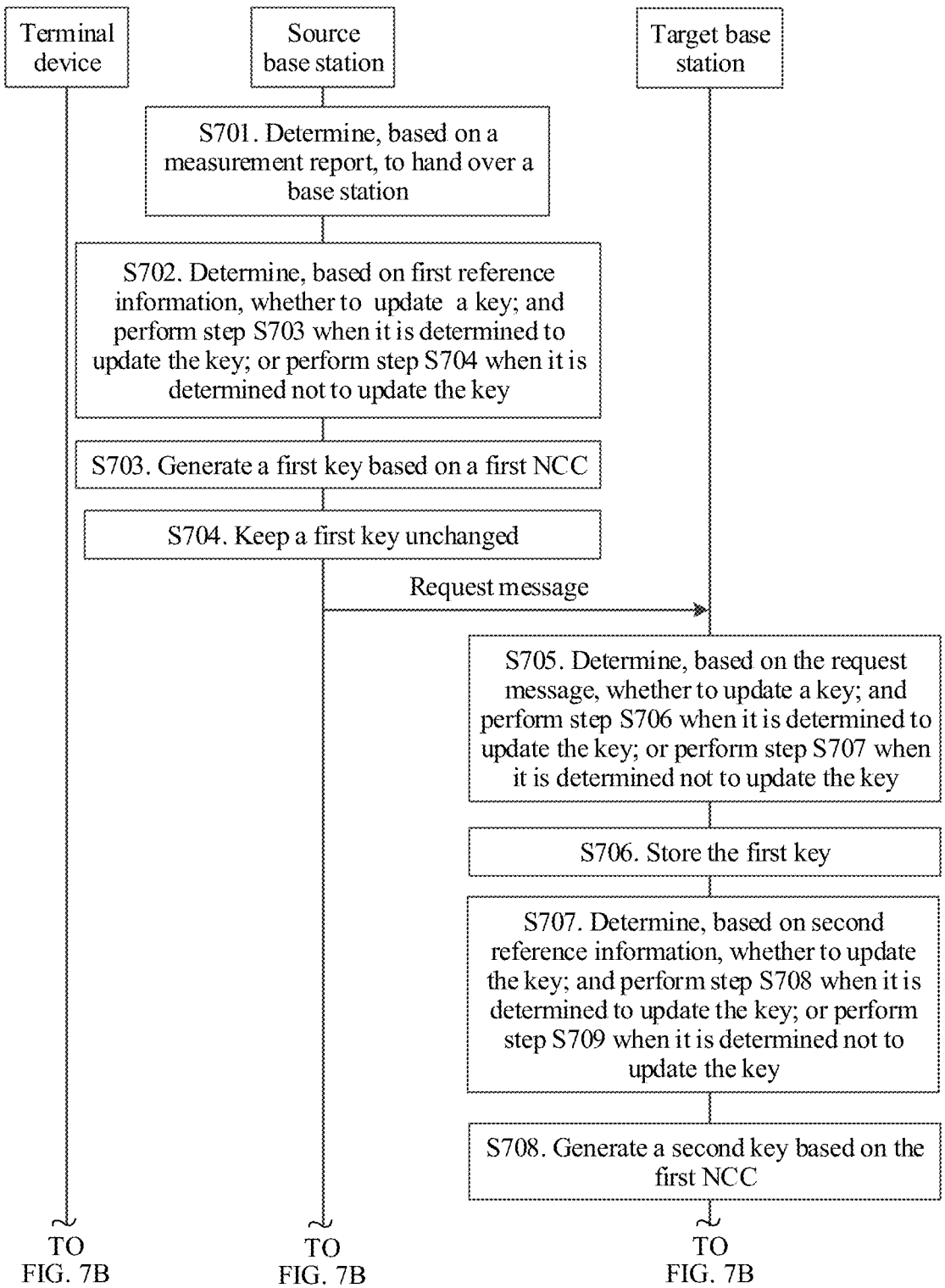
FIG. 7A and FIG. 7B are a schematic diagram of an interactive procedure of another communication method according to an embodiment of the present disclosure.
Figure 7B:
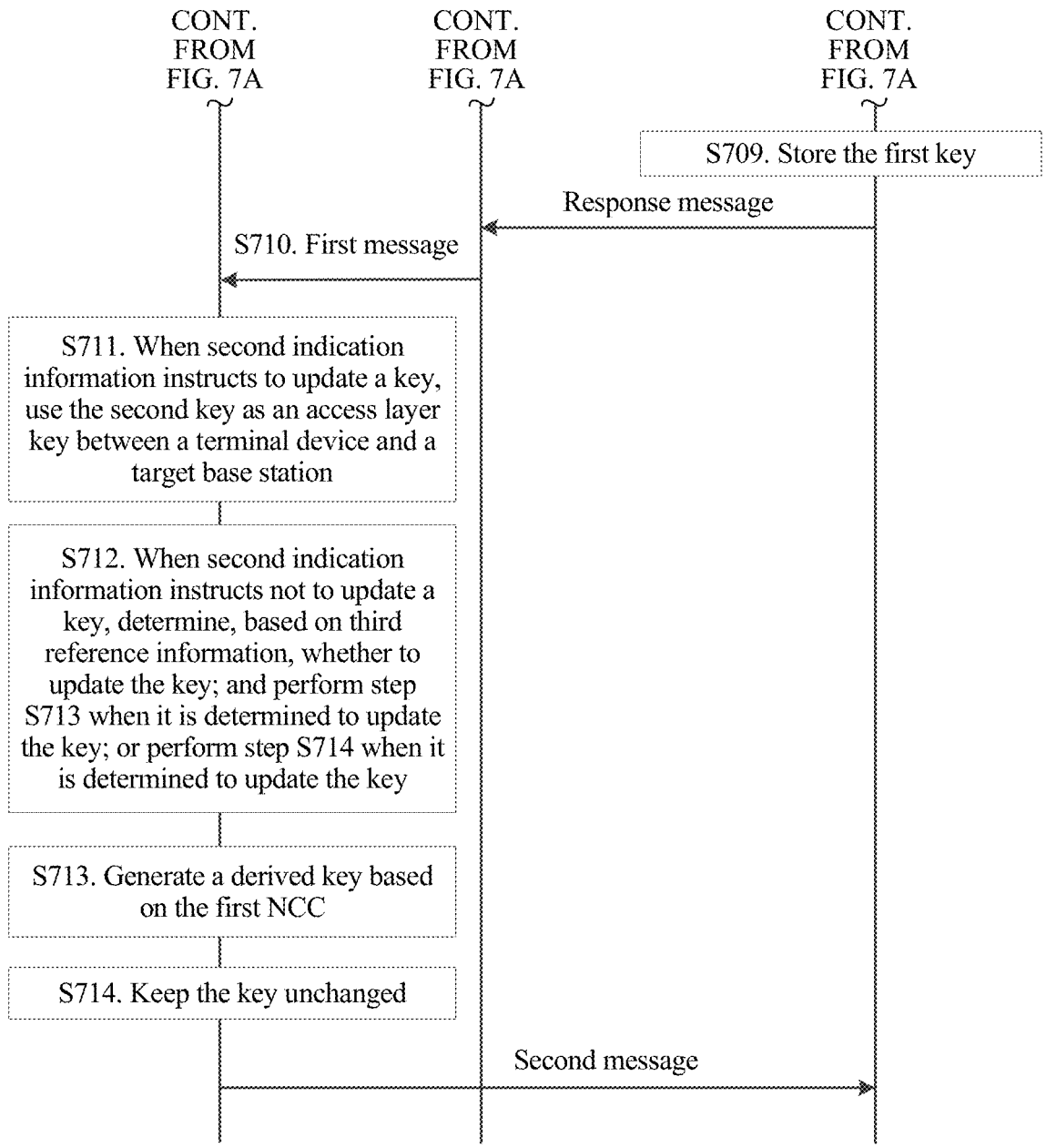

FIG. 7A and FIG. 7B show another communication method according to an embodiment of the present disclosure. As shown in FIG. 7A and FIG. 7B, the method includes the following operations.

S701. A source base station determines, based on a measurement report, to hand over a base station.

S702. The source base station determines, based on first reference information, whether to update an access layer key between the source base station and a terminal device.

The source base station performs operation S703 when the source base station determines, based on the first reference information, to update the access layer key between the source base station and the terminal device; or the source base station performs operation S704 when the source base station determines, based on the first reference information, not to update the access layer key between the source base station and the terminal device.

For related descriptions of this operation (S702), refer to related descriptions of operation S602. Details are not described again.

S703. The source base station generates a first key based on a first NCC, and sends a request message to a target base station.

The request message includes the first key and first indication information, and the first indication information is used to indicate that the first key is an updated key. The request message may be a handover request, and the handover request is used to request the target base station to prepare for a handover.

For related descriptions of this operation (S703), refer to related descriptions of operation S603. Details are not described again.

S704. The source base station keeps the first key unchanged, and sends a request message to a target base station.

The request message includes the first key and first indication information, and the first indication information is used to indicate that the first key is not an updated key.

It should be noted that for the first indication information, refer to related descriptions in the embodiment in FIG. 2. Details are not described again.

S705. The target base station determines, based on the request message, whether to update a key.

The target base station performs operation S706 when the target base station determines, based on the request message, whether to update an access layer key between the target base station and the terminal device; or the target base station performs operation S707 when the target base station determines, based on the request message, not to update an access layer key between the target base station and the terminal device.

For example, when the first indication information is used to indicate that the first key is an updated key, the target base station performs operation S706; or when the first indication information is used to indicate that the first key is not an updated key, the target base station performs operation S707.

S706. The target base station stores the first key, and sends a response message to the source base station.

The response message carries second indication information, and the second indication information is used to indicate that the access layer key between the target base station and the terminal device is an updated key.

S707. The target base station determines, based on second reference information, whether to update the access layer key between the target base station and the terminal device.

The target base station performs operation S708 when the target base station determines, based on the second reference information, to update the access layer key between the target base station and the terminal device; or the target base station performs operation S709 when the target base station determines, based on the second reference information, not to update the access layer key between the target base station and the terminal device.

For related descriptions of this operation (S707), refer to related descriptions of operation S607. Details are not described again.

S708. The target base station generates a second key based on the first NCC, and sends a response message to the source base station.

The response message carries second indication information, and the second indication information is used to indicate that the access layer key between the target base station and the terminal device is an updated key.

S709. The target base station stores the first key, and sends a response message to the source base station.

The response message carries second indication information, and the second indication information is used to indicate that the access layer key between the target base station and the terminal device is not an updated key.

It should be noted that for the second indication information, refer to related descriptions in the embodiment in FIG. 2. Details are not described again.

S710. The source base station sends a first message to the terminal device based on the response message.

The response message carries the first message, and the first message is used to request to change an RRC connection, for example, establish or change or release a radio bearer. The first message may include the first NCC and the second indication information.

The first message may be an RRC connection reconfiguration message.

In one embodiment, that the source base station sends the second indication information to the terminal device includes the following:

when the source base station and the target base station belong to a same CU, the source base station sends the second indication information to the terminal device, where the second indication information indicates that the access layer key between the target base station and the terminal device is not an updated key; or when the source base station and the target base station belong to a same CU, the source base station sends the second indication information to the terminal device based on a quantity of times that the terminal device does not update a key of the terminal device.

That the source base station sends the second indication information to the terminal based on a quantity of times that the terminal device does not update a key of the terminal device may include the following:

when the quantity of times that the terminal device does not update the key of the terminal device is greater than or equal to a count threshold, the source base station sends the second indication information to the terminal device, where the second indication information is used to indicate that the access layer key between the target base station and the terminal device is an updated key; or when the quantity of times that the terminal device does not update the key of the terminal device is less than a count threshold, the source base station sends the second indication information to the terminal device, where the second indication information is used to indicate that the access layer key between the target base station and the terminal device is not an updated key.

For related descriptions of this operation (S710), refer to related descriptions of operation S610. Details are not described again.

When the second indication information instructs to update a key, the terminal device performs operation S711; or when the second indication information instructs not to update a key, the terminal device performs operation S712.

S711. The terminal device uses the second key as the access layer key between the terminal device and the target base station, and sends a second message to the target base station.

The second message may be an RRC connection reconfiguration complete message.

In one embodiment, the second message may include third indication information, and the third indication information is used to instruct the terminal device to update a key.

S712. The terminal device determines, based on third reference information, whether to update the key.

When the third reference information instructs to update a key, the terminal device performs operation S713; or when the third reference information instructs not to update a key, the terminal device performs operation S714.

The third reference information includes third policy indication information, the quantity of times that the terminal device does not update the key, and status information indicating whether a TAI, a RAN group, or a RAT that is perceived by the terminal device is changed.

For example, the terminal device performs operation S713 when the third reference information includes the third policy indication information, and the third policy indication information is used to instruct the terminal device to update the key of the terminal device.

Alternatively, the terminal device performs operation S714 when the third reference information includes the third policy indication information, and the third policy indication information is used to instruct the terminal device not to update the key of the terminal device.

Alternatively, the terminal device performs operation S713 when the third reference information includes the quantity of times that the terminal device does not update the key, and the quantity of times that the terminal device does not update the key exceeds a count threshold.

Alternatively, the terminal device performs operation S714 when the third reference information includes the quantity of times that the terminal device does not update the key, and the quantity of times that the terminal device does not update the key does not exceed a count threshold.

Alternatively, the terminal device performs operation S713 when the third reference information includes the status information indicating whether the TAI, the RAN group, or the RAT that is perceived by the terminal device is changed, and the status information indicates that any one of the TAI, the RAN group, and the RAT that are perceived by the terminal device is changed.

Alternatively, the terminal device performs operation S714 when the third reference information includes the status information indicating whether the TAI, the RAN group, or the RAT that is perceived by the terminal device is changed, and the status information indicates that none of the TAI, the RAN group, and the RAT that are perceived by the terminal device is changed.

For the third policy indication information, refer to related descriptions in the embodiment shown in FIG. 4. Details are not described again.

S713. The terminal device generates a derived key based on the first NCC, and sends a second message to the target base station.

The second message may be an RRC connection reconfiguration complete message.

In one embodiment, the second message may include the third indication information, and the third indication information is used to instruct the terminal device to update a key.

It should be noted that for a process in which the terminal device generates the derived key based on the first NCC, refer to related content of operation S202. Details are not described herein again.

S714. The terminal device keeps the key unchanged, and sends the second message to the target base station.

The second message may be an RRC connection reconfiguration complete message.

In one embodiment, the second message may include the third indication information, and the third indication information is used to instruct the terminal device not to update a key.

It should be noted that for the third indication information, refer to related descriptions in the embodiments shown in FIG. 4 and FIG. 5. For the second message, refer to related descriptions of operation S403 and operation S502. Details are not described herein again.

In the solution in this embodiment of the present disclosure, the source base station determines, based on the first reference information, whether to update a key, and generates the first key and sets the first indication information. The source base station sends the handover request to the target base station, and the handover request includes the first key and the NCC. The target base station determines, based on the first indication information and the second reference information, whether to update a key, and generates the second key and sets the second indication information. The target base station sends the second indication information to the terminal device. The terminal device determines, based on the second indication information and the third reference information, whether to update a key, and generates the derived key and the third indication information. Compared with the prior art, using the solution in this embodiment of the present disclosure helps resolve a problem that a potential security risk exists in data transmitted between the terminal device and the target base station, and helps resolve a problem that a key change of the terminal device is not controlled by the base station.

In one embodiment, in an implementation scenario of the foregoing embodiment, when the second indication information is used to indicate that the access layer key between the target base station and the terminal device is not an updated key, and the third indication information is used to instruct the terminal device to update a key, the method further includes the following operations:

S715. The target base station generates a second key based on the first NCC, and sends the first NCC to the terminal device, so that the terminal device generates a derived key based on the first NCC.

S716. The terminal device generates the derived key based on the first NCC.

In one embodiment, in another implementation scenario of the foregoing embodiment, when the second indication information is used to indicate that the access layer key between the target base station and the terminal device is an updated key, and the third indication information is used to instruct the terminal device not to update a key, the method further includes the following operations:

S715a. The target base station sends the first NCC to the terminal device, so that the terminal device generates a derived key based on the first NCC.

S716a. The terminal device generates the derived key based on the first NCC.

In one embodiment, in still another implementation scenario of the foregoing embodiment, the method further includes the following operations:

S715b. After the target base station receives a new NCC from an AMF entity or an MME, the target base station generates a second key based on the new NCC, and sends the new NCC to the terminal device.

S716b. The terminal device generates a derived key based on the new NCC.

It should be noted that for operations S701 to S716b, refer to related descriptions in the embodiments shown in FIG. 2, FIG. 3, FIG. 4, and FIG. 5. Details are not described herein again.

In a specific application scenario of the foregoing embodiment, the terminal device sends an RRC connection reconfiguration complete message to the target base station. When the terminal device determines that the message is unsuccessfully sent, the terminal device constructs an RRC connection re-establishment request message, and sends the RRC connection re-establishment request message to the target base station. The message is used to re-establish an RRC connection. After receiving the message, the target base station can determine that the terminal device updates the key, and send an RRC connection re-establishment complete message to the terminal device, to respond to the RRC connection re-establishment request message.

Figure 8:
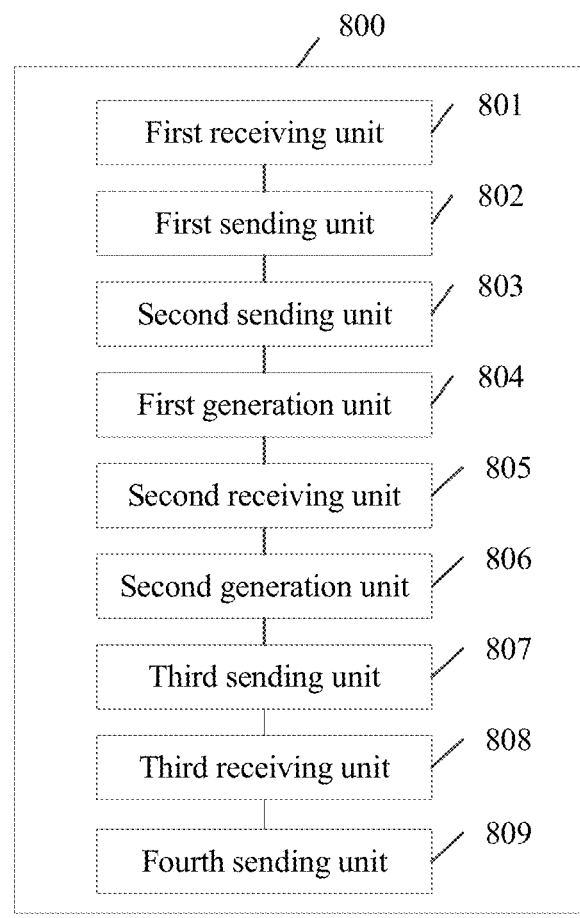
FIG. 8 is a schematic structural diagram of a base station according to an embodiment of the present disclosure.
Figure 9:
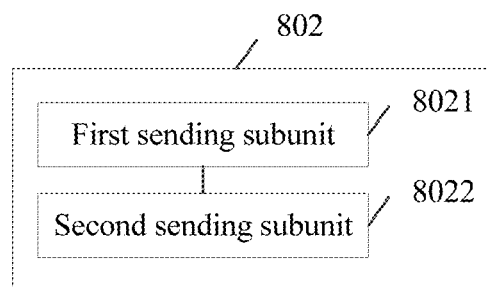
FIG. 9 is a schematic diagram of a partial structure of a base station according to an embodiment of the present disclosure.

FIG. 8 is a schematic structural diagram of a base station according to an embodiment of the present disclosure. As shown in FIG. 8, the base station 800 includes:

a first receiving unit 801, configured to receive a handover request from a source base station, where the handover request includes a first key and first indication information, and the first indication information is used to indicate whether the first key is an updated key; and a first sending unit 802, configured to send second indication information to the source base station based on the handover request, where the second indication information is used to indicate whether an access layer key between the target base station and a terminal device is an updated key.

The first sending unit 802 includes:

a first sending subunit 8021, configured to send the second indication information to the source base station when the first indication information is used to indicate that the first key is an updated key, where the second indication information is used to indicate that the access layer key between the target base station and the terminal device is an updated key; or a second sending subunit 8022, configured to send the second indication information to the source base station based on reference information when the first indication information is used to indicate that the first key is not an updated key.

In one embodiment, the second sending subunit 8022 includes:

a third sending subunit 80221, configured to send the second indication information to the source base station when the reference information includes a trust level of the target base station for the source base station, and the trust level is higher than a trust threshold, where the second indication information is used to indicate that the access layer key between the target base station and the terminal device is not an updated key; or a fourth sending subunit 80222, configured to send the second indication information to the source base station when the reference information includes policy indication information, and the policy indication information instructs the target base station not to update a key, where the second indication information is used to indicate that the access layer key between the target base station and the terminal device is not an updated key.

In one embodiment, the second sending subunit 8022 includes:

a fifth sending subunit 80223, configured to send the second indication information to the source base station when the reference information includes a trust level of the target base station for the source base station, and the trust level is lower than a trust threshold, where the second indication information is used to indicate that the access layer key between the target base station and the terminal device is an updated key; or a sixth sending subunit 80224, configured to send, by the target base station, the second indication information to the source base station when the reference information includes policy indication information, and the policy indication information instructs the target base station to update a key, where the second indication information is used to indicate that the access layer key between the target base station and the terminal device is an updated key.

The handover request further includes a next hop chaining counter NCC, and the base station 800 further includes:

a second sending unit 803, configured to send the NCC to the terminal device by using the source base station.

The base station 800 further includes:

a first generation unit 804, configured to generate a second key based on the NCC when the second indication information is used to indicate that the access layer key between the target base station and the terminal device is an updated key.

In one embodiment, the base station 800 further includes:

a second receiving unit 805, configured to receive third indication information from the terminal device;

a second generation unit 806, configured to generate a second key based on a NCC when the third indication information is used to instruct the terminal device to update a key, and the second indication information is used to indicate that the access layer key between the target base station and the terminal device is not an updated key; and a third sending unit 807, configured to send the NCC to the terminal device.

In one embodiment, the base station 800 further includes:

a third receiving unit 808, configured to receive third indication information from the terminal device; and a fourth sending unit 809, configured to send the NCC to the terminal device when the third indication information is used to instruct the terminal device not to update a key, and the second indication information is used to indicate that the access layer key between the target base station and the terminal device is an updated key.

It should be noted that the units (the first receiving unit 801, the first sending unit 802, the second sending unit 803, the first generation unit 804, the second receiving unit 805, the second generation unit 806, the third sending unit 807, the third receiving unit 808, and the fourth sending unit 809) are configured to perform related operations of the foregoing method.

In this embodiment, the base station 800 is presented in a form of a unit. The "unit" herein may be an application-specific integrated circuit (ASIC), a processor and a memory that execute one or more software or firmware programs, an integrated logic circuit, and/or another component that may provide the foregoing functions. In addition, the first receiving unit 801, the first sending unit 802, the second sending unit 803, the first generation unit 804, the second receiving unit 805, the second generation unit 806, the third sending unit 807, the third receiving unit 808, and the fourth sending unit 809 may be implemented by using a processor 1401 of a base station shown in FIG. 14.

Figure 10:
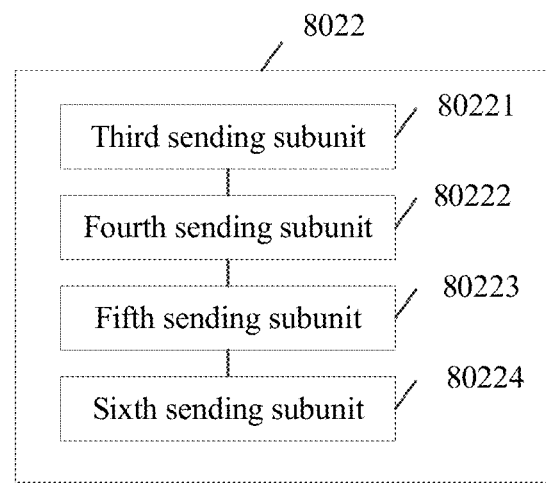
FIG. 10 is a schematic diagram of a partial structure of another base station according to an embodiment of the present disclosure.
Figure 11:
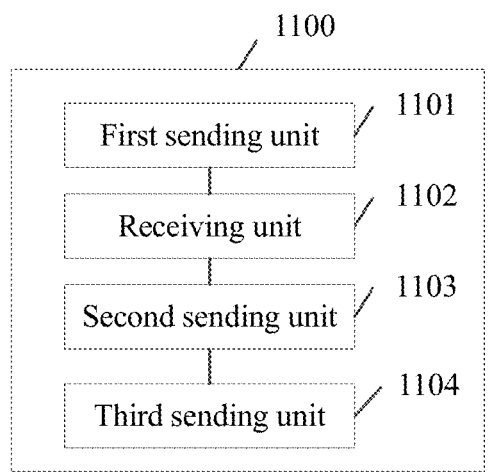
FIG. 11 is a schematic structural diagram of another base station according to an embodiment of the present disclosure.

FIG. 11 is a schematic structural diagram of a base station according to an embodiment of the present disclosure. As shown in FIG. 10, the base station 1100 includes:

a first sending unit 1101, configured to send a handover request to a target base station, where the handover request carries a first key and first indication information, and the first indication information is used to indicate whether the first key is an updated key;

a receiving unit 1102, configured to receive second indication information from the target base station, where the second indication information is used to indicate whether an access layer key between the target base station and the terminal device is an updated key; and a second sending unit 1103, configured to send the second indication information to the terminal device.

In one embodiment, the base station 1100 further includes:

a third sending unit 1104, configured to send a first message to the terminal device when the second indication information indicates that the access layer key between the target base station and the terminal device is an updated key, or when the first indication information indicates that the first key is not an updated key and the second indication information indicates that the access layer key between the target base station and the terminal device is an updated key, or when the first indication information indicates that the first key is an updated key and the second indication information indicates that the access layer key between the target base station and the terminal device is an updated key, where the first message is used to request to change an RRC connection.

In one embodiment, when the source base station and the target base station belong to a same central unit CU, the first indication information is used to indicate that the first key is not an updated key; or when the source base station and the target base station do not belong to a same CU, the first indication information is used to indicate that the first key is an updated key; or when a trust level of the source base station for the target base station is lower than a trust threshold, the first indication information is used to indicate that the first key is an updated key; or when a trust level of the source base station for the target base station is higher than a trust threshold, the first indication information is used to indicate that the first key is not an updated key.

It should be noted that the units (the first sending unit 1101, the receiving unit 1102, the second sending unit 1103, and the third sending unit 1104) are configured to perform related operations of the foregoing method.

Figure 15:
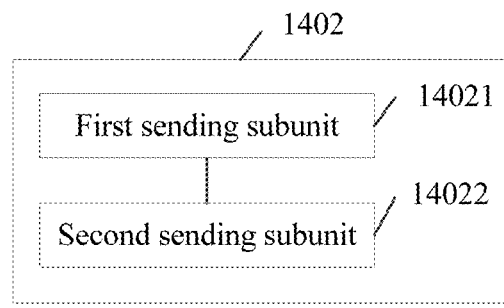
FIG. 15 is a schematic diagram of a partial structure of another terminal device according to an embodiment of the present disclosure.

In this embodiment, the base station 1100 is presented in a form of a unit. The "unit" herein may be an application-specific integrated circuit (ASIC), a processor and a memory that execute one or more software or firmware programs, an integrated logic circuit, and/or another component that may provide the foregoing functions. In addition, the first sending unit 1101, the receiving unit 1102, the second sending unit 1103, and the third sending unit 1104 may be implemented by using a processor 1501 of a base station shown in FIG. 15.

Figure 12:
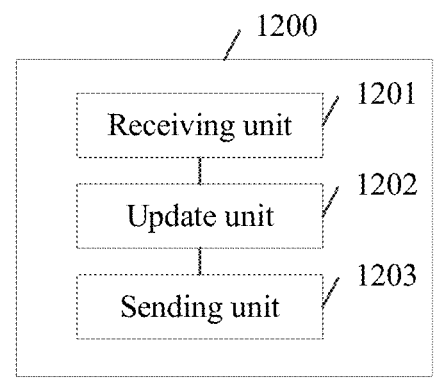
FIG. 12 is a schematic structural diagram of another terminal device according to an embodiment of the present disclosure.
Figure 13:
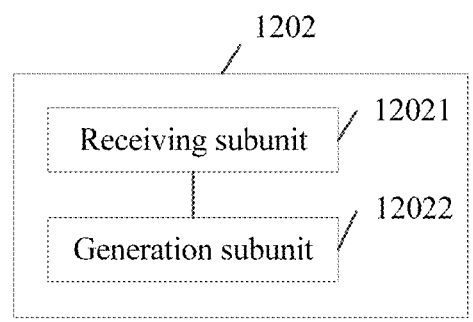
FIG. 13 is a schematic diagram of a partial structure of another terminal device according to an embodiment of the present disclosure.

FIG. 12 is a schematic structural diagram of a terminal device according to an embodiment of the present disclosure. As shown in FIG. 12, the terminal device 1200 includes:

a receiving unit 1201, configured to receive second indication information from a source base station, where the second indication information is used to indicate whether an access layer key between a target base station and the terminal device is an updated key; and an update unit 1202, configured to update a key of the terminal device based on the second indication information.

In one embodiment, the update unit 1202 is configured to:

update the key of the terminal device when the second indication information is used to indicate that the access layer key between the target base station and the terminal device is an updated key; or update the key of the terminal device based on reference information when the second indication information is used to indicate that the access layer key between the target base station and the terminal device is not an updated key.

In one embodiment, the update unit 1202 is configured to:

update the key of the terminal device when the reference information includes policy indication information, and the policy indication information is used to instruct the terminal device to update a key.

The update unit 1202 includes:

a receiving subunit 12021, configured to receive a next hop chaining counter NCC; and a generation subunit 12022, configured to generate a derived key based on the NCC.

In one embodiment, the terminal device further includes:

a sending unit 1203, configured to send third indication information to the target base station, where the third indication information is used to instruct the terminal device to update a key.

It should be noted that the units (the receiving unit 1201, the update unit 1202, and the sending unit 1203) are configured to perform related operations of the foregoing method.

In this embodiment, the terminal device 1200 is presented in a form of a unit. The "unit" herein may be an application-specific integrated circuit (ASIC), a processor and a memory that execute one or more software or firmware programs, an integrated logic circuit, and/or another component that may provide the foregoing functions. In addition, the receiving unit 1201, the update unit 1202, and the sending unit 1203 may be implemented by using a processor 1601 of a terminal device shown in FIG. 16.

Figure 14:
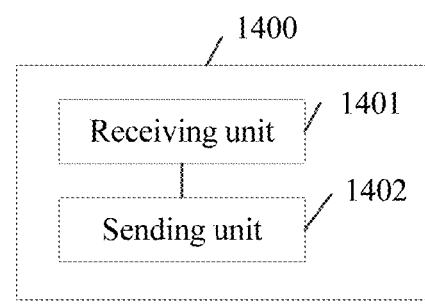
FIG. 14 is a schematic structural diagram of another terminal device according to an embodiment of the present disclosure.

FIG. 14 is a schematic structural diagram of a terminal device according to an embodiment of the present disclosure. As shown in FIG. 14, the terminal device 1400 includes:

a receiving unit 1401, configured to receive second indication information from a source base station, where the second indication information is used to indicate whether an access layer key between a target base station and the terminal device is an updated key; and a sending unit 1402, configured to send third indication information to the target base station based on the second indication information, where the third indication information is used to instruct the terminal device not to update a key.

The sending unit includes:

a first sending unit 14021, configured to send the third indication information to the target base station when the second indication information is used to indicate that the access layer key between the target base station and the terminal device is not an updated key; or a second sending unit 14022, configured to send the third indication information to the target base station based on reference information when the second indication information is used to indicate that the access layer key between the target base station and the terminal device is not an updated key.

In one embodiment, the second sending unit 14022 is configured to:

send the third indication information to the target base station when the reference information includes policy indication information, and the policy indication information is used to instruct the terminal device not to update a key.

It should be noted that the units (the receiving unit 1401 and the sending unit 1402) are configured to perform related operations of the foregoing method.

In this embodiment, the terminal device 1400 is presented in a form of a unit. The "unit" herein may be an application-specific integrated circuit (ASIC), a processor and a memory that execute one or more software or firmware programs, an integrated logic circuit, and/or another component that may provide the foregoing functions. In addition, the receiving unit 1401 and the sending unit 1402 may be implemented by using a processor 1901 of a terminal device shown in FIG. 19.

Figure 16:
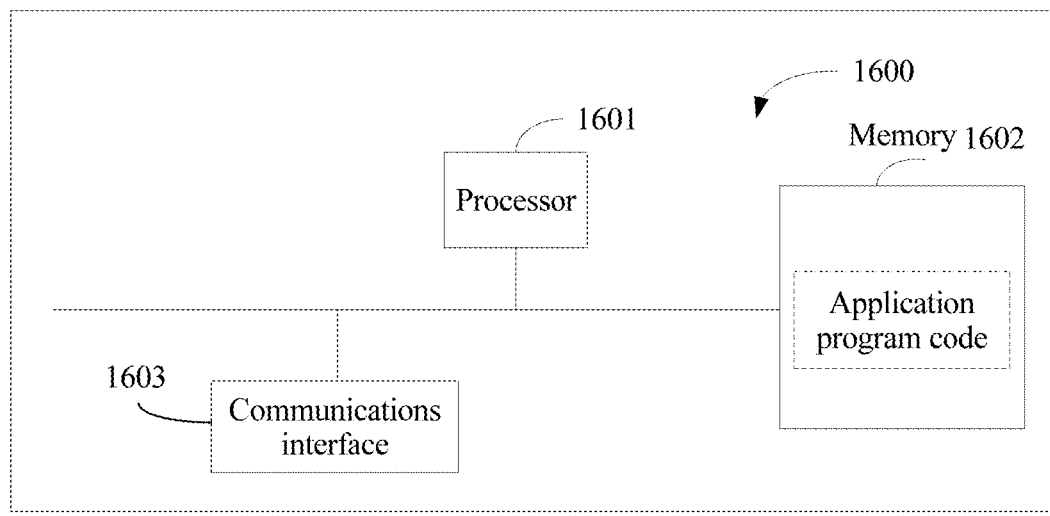
FIG. 16 is a schematic structural diagram of another base station according to an embodiment of the present disclosure.

As shown in FIG. 16, a base station 1600 may be implemented in a structure shown in FIG. 16. The base station 1600 includes at least one processor 1601, at least one memory 1602, and at least one communications interface 1603. The processor 1601, the memory 1602, and the communications interface 1603 are connected and communicate with each other by using a communications bus.

The processor 1601 may be a general-purpose central processing unit (CPU), a microprocessor, an application-specific integrated circuit (ASIC), or one or more integrated circuits configured to control execution of the foregoing solution program.

The communications interface 1603 is configured to communicate with another device or a communications network, such as the Ethernet, a radio access network (RAN), or a wireless local area network (WLAN).

The memory 1602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may be alternatively integrated with the processor.

The memory 1602 is configured to store application program code for executing the foregoing solution, and the processor 1601 controls the execution. The processor 1601 is configured to execute the application program code stored in the memory 1602.

The code stored in the memory 1602 may be used to perform the communication method provided above and performed by a target base station. For example, the target base station receives a handover request from a source base station, where the handover request is used to request the target base station to prepare for a handover, the handover request includes a first key and first indication information, and the first indication information is used to indicate whether the first key is an updated key; and the target base station sends second indication information to the source base station based on the handover request, where the second indication information is used to indicate whether an access layer key between the target base station and a terminal device is an updated key.

Figure 17:
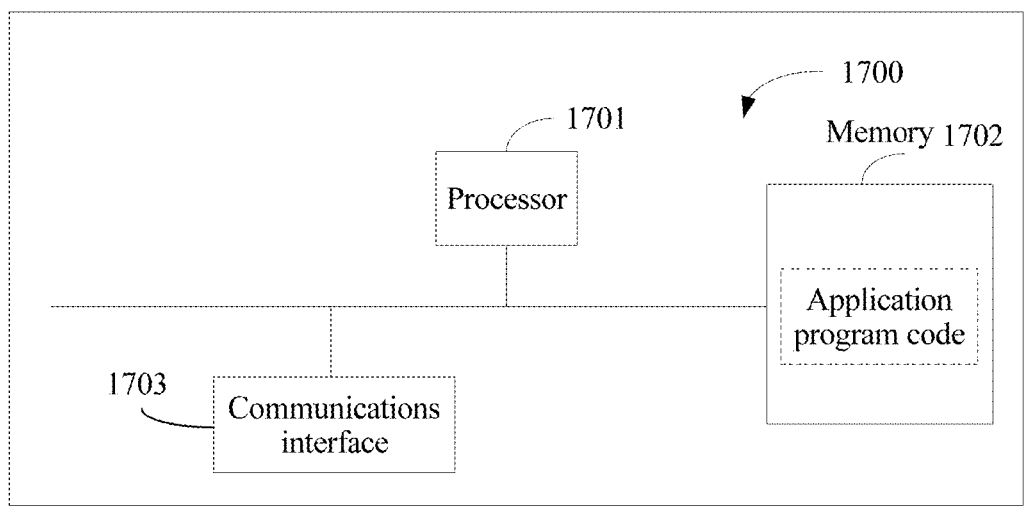
FIG. 17 is a schematic structural diagram of another base station according to an embodiment of the present disclosure.

As shown in FIG. 17, a base station 1700 may be implemented in a structure shown in FIG. 17. The base station 1700 includes at least one processor 1701, at least one memory 1702, and at least one communications interface 1703. The processor 1701, the memory 1702, and the communications interface 1703 are connected and communicate with each other by using the communications bus.

The processor 1701 may be a general-purpose central processing unit (CPU), a microprocessor, an application-specific integrated circuit (ASIC), or one or more integrated circuits configured to control execution of the foregoing solution program.

The communications interface 1703 is configured to communicate with another device or a communications network, such as the Ethernet, a radio access network (RAN), or a wireless local area network (Wireless Local Area Networks, WLAN).

The memory 1702 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may be alternatively integrated with the processor.

The memory 1702 is configured to store application program code for executing the foregoing solution, and the processor 1701 controls the execution. The processor 1701 is configured to execute the application program code stored in the memory 1702.

The code stored in the memory 1702 may be used to perform the communication method provided above and performed by a source base station. For example, the source base station sends a handover request to a target base station, where the handover request is used to request the target base station to prepare for a handover, the handover request carries a first key and first indication information, and the first indication information is used to indicate whether the first key is an updated key; the source base station receives second indication information from the target base station, where the second indication information is used to indicate whether an access layer key between the target base station and a terminal device is an updated key; and the source base station sends the second indication information to the terminal device.

Figure 18:
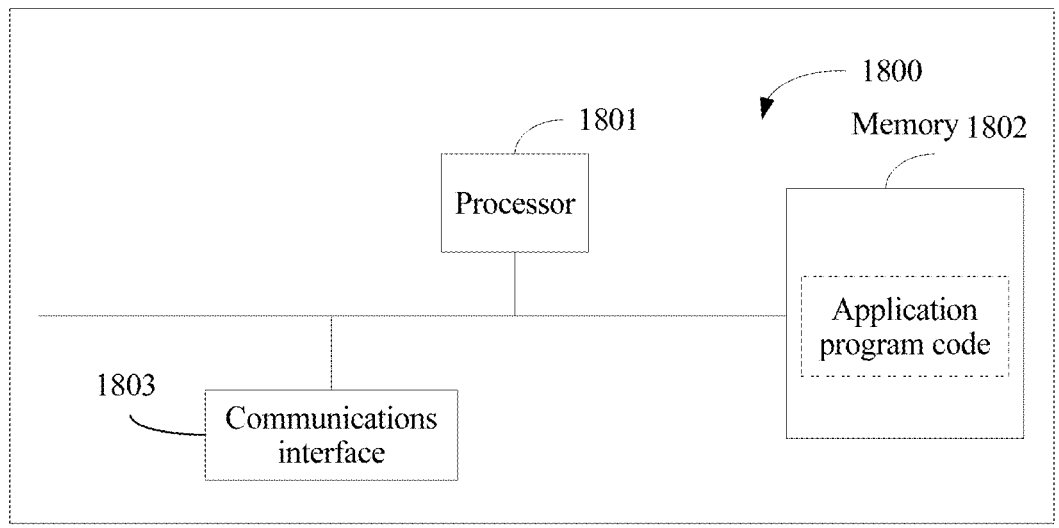
FIG. 18 is a schematic structural diagram of another terminal device according to an embodiment of the present disclosure.

As shown in FIG. 18, a terminal device 1800 may be implemented in a structure shown in FIG. 18. The terminal device 1800 includes at least one processor 1801, at least one memory 1802, and at least one communications interface 1803. The processor 1801, the memory 1802, and the communications interface 1803 are connected and communicate with each other by using the communications bus.

The processor 1801 may be a general-purpose central processing unit (CPU), a microprocessor, an application-specific integrated circuit (ASIC), or one or more integrated circuits configured to control execution of the foregoing solution program.

The communications interface 1803 is configured to communicate with another device or a communications network, such as the Ethernet, a radio access network (RAN), or a wireless local area network (WLAN).

The memory 1802 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may be alternatively integrated with the processor.

The memory 1802 is configured to store application program code for executing the foregoing solution, and the processor 1801 controls the execution. The processor 1801 is configured to execute the application program code stored in the memory 1802.

The code stored in the memory 1802 may be used to perform the communication method provided above and performed by a terminal device. For example, the terminal device receives second indication information from a source base station, where the second indication information is used to indicate whether an access layer key between a target base station and the terminal device is an updated key; and the terminal device updates a key of the terminal device based on the second indication information.

Figure 19:
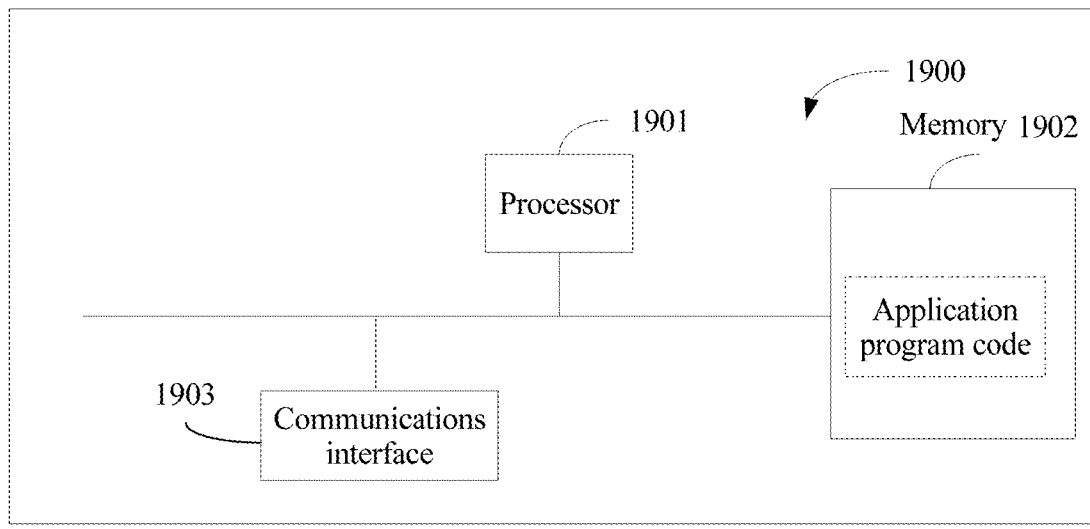
FIG. 19 is a schematic structural diagram of another terminal device according to an embodiment of the present disclosure.

As shown in FIG. 19, a terminal device 1900 may be implemented in a structure shown in FIG. 19. The terminal device 1900 includes at least one processor 1901, at least one memory 1902, and at least one communications interface 1903. The processor 1901, the memory 1902, and the communications interface 1903 are connected and communicate with each other by using the communications bus.

The processor 1901 may be a general-purpose central processing unit (CPU), a microprocessor, an application-specific integrated circuit (ASIC), or one or more integrated circuits configured to control execution of the foregoing solution program.

The communications interface 1903 is configured to communicate with another device or a communications network, such as the Ethernet, a radio access network (RAN), or a wireless local area network (WLAN).

The memory 1902 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may be alternatively integrated with the processor.

The memory 1902 is configured to store application program code for executing the foregoing solution, and the processor 1901 controls the execution. The processor 1901 is configured to execute the application program code stored in the memory 1902.

The code stored in the memory 1902 may be used to perform the communication method provided above and performed by a terminal device. For example, the terminal device receives second indication information from a source base station, where the second indication information is used to indicate whether an access layer key between a target base station and the terminal device is an updated key; and the terminal device sends third indication information to the target base station based on the second indication information, where the third indication information is used to instruct the terminal device not to update a key.

An embodiment of the present disclosure further provides a computer storage medium. The computer storage medium may store a program, and when the program is executed, some or all of the operations of any communication method described in the foregoing method embodiment are performed.

An embodiment of the present disclosure further provides a chip, and the chip is configured to implement all or some of the operations in the embodiments shown in FIG. 2, FIG. 6A and FIG. 6B, and FIG. 7A and FIG. 7B.

An embodiment of the present disclosure further provides a chip, and the chip is configured to implement all or some of the operations in the embodiments shown in FIG. 3, FIG. 6A and FIG. 6B, and FIG. 7A and FIG. 7B.

An embodiment of the present disclosure further provides a chip, and the chip is configured to implement all or some of the operations in the embodiments shown in FIG. 4, FIG. 5, FIG. 6A and FIG. 6B, and FIG. 7A and FIG. 7B.

It should be noted that to make the description brief, the foregoing method embodiments are expressed as a series of actions. However, a person skilled in the art should appreciate that the present disclosure is not limited to the described action sequence, because according to the present disclosure, some operations may be performed in other sequences or performed simultaneously. In addition, a person skilled in the art should also understand that the embodiments described in this specification all belong to embodiments, and the actions and units are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present disclosure essentially, or the part contributing to the prior art, or all or some of the technical solutions may be implemented in the form of a software product. The computer software product is stored in a memory and includes several instructions for instructing a computer device (which may be a personal computer, a server, a network device, or the like) to perform all or some of the operations of the methods described in the embodiments of the present disclosure. The foregoing memory includes any medium that can store program code, such as a USB flash drive, a read-only memory (ROM), a random access memory (RAM), a removable hard disk, a magnetic disk, or an optical disc.

A person of ordinary skill in the art may understand that all or some of the operations of the methods in the embodiments may be implemented by a program instructing related hardware. The program may be stored in a computer readable memory. The memory may include a flash memory, a read-only memory (ROM), a random access memory (RAM), a magnetic disk, an optical disc, or the like.

The embodiments of the present disclosure are described in detail above. The principle and implementations of the present disclosure are described herein through specific examples. The descriptions about the embodiments are merely provided to help understand the method and core ideas of the present disclosure. In addition, a person of ordinary skill in the art can make variations and modifications to the present disclosure in terms of the specific implementations and application scopes according to the ideas of the present disclosure. In conclusion, the content of specification shall not be construed as a limit to the present disclosure.

What is claimed is:

1. A communication method, comprising:
   sending, by a source base station, a handover request to a target base station, wherein the handover request carries a first key and first indication information, wherein the first indication information indicates whether a first access layer key between the source base station and a terminal device is an updated key;
   receiving, by the source base station, second indication information sent by the target base station based on the handover request, wherein the second indication information indicates whether a second access layer key between the target base station and the terminal device is an updated key, wherein the second indication information is sent to the source base station based on reference information when the first indication information indicates that the first access layer key is not an updated key, wherein the reference information comprises a trust level of the target base station for the source base station; and
   sending, by the source base station, the second indication information to the terminal device.

2. The method according to claim 1, wherein the second indication information indicates that the second access layer key between the target base station and the terminal device is an updated key.

3. The method according to claim 1, wherein wherein the second indication information indicates that the second access layer key is not an updated key.

4. The method according to claim 1, wherein the target base station sends the second indication information to the source base station when the reference information comprises policy indication information, wherein the policy indication information instructs the target base station not to update a key, wherein the second indication information indicates that the second access layer key is not an updated key.

5. The method according to claim 1, wherein wherein the trust level is lower than a trust threshold, wherein the second indication information indicates that the second access layer key is an updated key.

6. The method according to claim 1, wherein the target base station sends the second indication information to the source base station when the reference information comprises policy indication information, wherein the policy indication information instructs the target base station to update a key, wherein the second indication information indicates that the second access layer key is an updated key.

7. The method according to claim 1, wherein the target base station sends a next hop chaining counter (NCC) in the handover request to the terminal device via the source base station.

8. The method according to claim 7, wherein the target base station receives third indication information from the terminal device and sends the NCC to the terminal device when the third indication information instructs the terminal device not to update a key, wherein the second indication information indicates that the second access layer key is an updated key.

9. The method according to claim 1, further comprising:
   sending, by the source base station, a first message to the terminal device when the second indication information indicates that the second access layer key is an updated key, or when the first indication information indicates that the first access layer key is not an updated key and the second indication information indicates that the second access layer key is an updated key, wherein the first message is used to request to change a radio resource control (RRC) connection.

10. The method according to claim 1, further comprising:
sending, by the source base station, a first message to the terminal device when the first indication information indicates that the first access layer key is an updated key and the second indication information indicates that the second access layer key is an updated key, wherein the first message is to request to change a radio resource control (RRC) connection.

11. The method according to claim 1, wherein
when the source base station and the target base station belong to a same central unit (CU), the first indication information is to indicate that the first access layer key is not an updated key; or
when the source base station and the target base station do not belong to the same CU, the first indication information is to indicate that the first access layer key is an updated key; or
when a trust level of the source base station for the target base station is lower than a trust threshold, the first indication information is to indicate that the first access layer key is an updated key; or
when the trust level of the source base station for the target base station is higher than the trust threshold, the first indication information is to indicate that the first access layer key is not an updated key.

12. A source base station, comprising:
a processor;
a memory coupled to the processor and storing program instructions, which, when executed by the processor, cause the source base station to perform operations comprising:
sending a handover request to a target base station, wherein the handover request carries a first key and first indication information, wherein the first indication information indicates whether a first access layer key between the source base station and a terminal device is an updated key;
receiving second indication information sent by the target base station based on the handover request, wherein the second indication information indicates whether a second access layer key between the target base station and the terminal device is an updated key, wherein the second indication information is sent to the source base station based on reference information when the first indication information indicates that the first access layer key is not an updated key, wherein the reference information comprises a trust level of the target base station for the source base station; and
sending the second indication information to the terminal device.

13. The source base station according to claim 12, wherein the second indication information indicates that the second access layer key between the target base station and the terminal device is an updated key.

14. The source base station according to claim 12, wherein the trust level is higher than a trust threshold, wherein the second indication information indicates that the second access layer key is not an updated key.

15. The source base station according to claim 12, wherein the trust level is lower than a trust threshold, wherein the second indication information indicates that the second access layer key is an updated key.

16. The source base station according to claim 12, wherein the target base station sends the second indication information to the source base station when the reference information comprises policy indication information, wherein the policy indication information instructs the target base station to update a key, wherein the second indication information indicates that the second access layer key is an updated key.

17. The source base station according to claim 12, wherein the target base station sends a next hop chaining counter (NCC) in the handover request to the terminal device via the source base station.

18. The source base station according to claim 17, wherein the target base station receives third indication information from the terminal device and sends the NCC to the terminal device when the third indication information instructs the terminal device not to update a key, wherein the second indication information indicates that the second access layer key is an updated key.

19. A non-transitory computer readable medium storing program instructions, which, when executed by a processor, cause the processor to perform operations comprising:
sending, by a source base station, a handover request to a target base station, wherein the handover request carries a first key and first indication information, wherein the first indication information indicates whether a first access layer key between the source base station and a terminal device is an updated key;
receiving, by the source base station, second indication information sent by the target base station based on the handover request, wherein the second indication information indicates whether a second access layer key between the target base station and the terminal device is an updated key, wherein the second indication information is sent to the source base station based on reference information when the first indication information indicates that the first access layer key is not an updated key, wherein the reference information comprises a trust level of the target base station for the source base station; and
sending, by the source base station, the second indication information to the terminal device.

* * * * *